United States Patent
Chen et al.

(10) Patent No.: US 9,532,119 B2
(45) Date of Patent: Dec. 27, 2016

(54) APPARATUS AND METHOD FOR TRANSPORTING OPTICAL CHANNEL DATA UNIT ODU SERVICE

(71) Applicant: Huawei Technologies Co., Ltd., Shenzhen (CN)

(72) Inventors: Zhiyun Chen, Chengdu (CN); Huiyu Zhou, Chengdu (CN); Xing Hu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/855,320

(22) Filed: Sep. 15, 2015

(65) Prior Publication Data

US 2016/0007104 A1  Jan. 7, 2016

Related U.S. Application Data

(63) Continuation of application No. PCT/CN2013/072768, filed on Mar. 15, 2013.

(51) Int. Cl.
  *H04Q 11/00* (2006.01)
  *H04J 3/06* (2006.01)
  *H04J 3/16* (2006.01)

(52) U.S. Cl.
  CPC ......... *H04Q 11/0003* (2013.01); *H04J 3/0658* (2013.01); *H04J 3/1652* (2013.01);
  (Continued)

(58) Field of Classification Search
  CPC ............ H04Q 11/0003; H04Q 11/0005; H04Q 11/0066; H04Q 2011/0045; H04Q 2011/0086; H04J 3/0658; H04J 3/1652
  (Continued)

(56) References Cited

U.S. PATENT DOCUMENTS

| | | |
|---|---|---|
| 7,738,596 B2 | 6/2010 | Lin et al. |
| 2007/0211750 A1 | 9/2007 | Li et al. |

(Continued)

FOREIGN PATENT DOCUMENTS

| | | |
|---|---|---|
| CN | 101212424 A | 7/2008 |
| CN | 101610242 A | 12/2009 |

(Continued)

OTHER PUBLICATIONS

"Series G: Transmission Systems and Media, Digital Systems and Networks; Digital terminal equipments—General; Series Y: Global Information Infrastructure, Internet Protocol Aspects and Next-Generation Networks; Internet protocol aspects—Transport; Interfaces for the optical transport network," Recommendation ITU-T G.709/Y.1331, pp. i-227, International Telecommunication Union, Geneva, Switzerland (Feb. 2012).

*Primary Examiner* — Dalzid Singh
(74) *Attorney, Agent, or Firm* — Leydig, Voit & Mayer, Ltd.

(57) ABSTRACT

The present invention discloses an apparatus and a method for transporting an ODU service. The transport apparatus includes a first ODU service processing unit, a timeslot allocation unit, a switching output port allocation unit, an Ethernet switching unit, and a second ODU service processing unit, where a table of a mapping between output ports of the first ODU service processing unit and timeslots is determined according to a rate of an ODUflex frame carried in an obtained ODU service and the number of the output ports of the first ODU service processing unit, and the ODU service is forwarded, which resolves a problem in the prior art that an ODUflex frame cannot be transported by using the Ethernet switching unit, thereby ensuring that service congestion does not occur on a forwarding port of a sending (Continued)

apparatus, and improving transmission quality of a communications network.

17 Claims, 10 Drawing Sheets

(52) U.S. Cl.
CPC ..... *H04Q 11/0005* (2013.01); *H04Q 11/0066* (2013.01); *H04Q 2011/0045* (2013.01); *H04Q 2011/0086* (2013.01)

(58) Field of Classification Search
USPC .......................................................... 398/52
See application file for complete search history.

(56) References Cited

U.S. PATENT DOCUMENTS

| | | | |
|---|---|---|---|
| 2009/0074410 A1* | 3/2009 | Zou | H04J 3/1652 398/52 |
| 2009/0154479 A1 | 6/2009 | Kim et al. | |
| 2011/0013635 A1 | 1/2011 | Wan et al. | |
| 2011/0170866 A1 | 7/2011 | Loprieno et al. | |
| 2011/0255552 A1 | 10/2011 | Ellegard | |
| 2011/0286744 A1* | 11/2011 | Shin | H04J 3/1611 398/45 |
| 2012/0002671 A1 | 1/2012 | Xiao et al. | |
| 2012/0002965 A1 | 1/2012 | Bellato et al. | |
| 2012/0082456 A1* | 4/2012 | Su | H04J 3/1652 398/58 |
| 2012/0251127 A1 | 10/2012 | Ohkubo et al. | |

FOREIGN PATENT DOCUMENTS

| | | |
|---|---|---|
| CN | 101841741 A | 9/2010 |
| CN | 101389146 B | 1/2011 |
| CN | 102291631 A | 12/2011 |
| CN | 102369681 A | 3/2012 |
| CN | 102684994 A | 9/2012 |
| EP | 2451185 A1 | 5/2012 |
| EP | 2833580 A1 | 2/2015 |
| WO | WO 2012084527 A1 | 6/2012 |

* cited by examiner

| Timeslot sequence number | 1 | 2 | 3 | 4 | 5 | 6 | 7 | 8 | 9 | 10 | 11 | 12 |
|---|---|---|---|---|---|---|---|---|---|---|---|---|
| Higher-order ODU service | o1 | | | | o2 | | | | o1 | | | |

FIG. 4(a)

| Timeslot sequence number | 1 | 2 | 3 | 4 | 5 | 6 | 7 | 8 | 9 | 10 | 11 | 12 |
|---|---|---|---|---|---|---|---|---|---|---|---|---|
| Higher-order ODU service | o1 | | o2 | | o2 | | o1 | | o1 | | o2 | |

FIG. 4(b)

| Timeslot sequence number | 1 | 2 | 3 | 4 | 5 | 6 | 7 | 8 | 9 | 10 | 11 | 12 |
|---|---|---|---|---|---|---|---|---|---|---|---|---|
| Higher-order ODU service | si1 | | si2 | | si2 | | si1 | | si1 | | si2 | |

FIG. 4(c)

| Timeslot sequence number | 1 | 2 | 3 | 4 | 5 | 6 | 7 | 8 | 9 | 10 | 11 | 12 |
|---|---|---|---|---|---|---|---|---|---|---|---|---|
| Higher-order ODU service | so2 | | so1 | | so1 | | so2 | | so2 | | so1 | |

FIG. 4(d)

| Timeslot sequence number | 1 | 2 | 3 | 4 | 5 | 6 | 7 | 8 | 9 | 10 | 11 | 12 |
|---|---|---|---|---|---|---|---|---|---|---|---|---|
| Higher-order ODU sub-service 1 | o1 | o2 | o3 | o4 | o1 | o2 | o3 | o4 | o1 | o2 | o3 | o4 |
| Higher-order ODU sub-service 2 | o2 |  |  |  | o3 |  |  |  | o4 |  |  |  |

| 13 | 14 | 15 | 16 | 17 | 18 | 19 | 20 | 21 | 22 | 23 | 24 |
|---|---|---|---|---|---|---|---|---|---|---|---|
| o1 | o2 | o3 | o4 | o1 | o2 | o3 | o4 | o1 | o2 | o3 | o4 |
| o2 |  |  |  | o3 |  |  |  | o4 |  |  |  |

FIG. 6(a)

| Timeslot sequence number | 1 | 2 | 3 | 4 | 5 | 6 | 7 | 8 | 9 | 10 | 11 | 12 |
|---|---|---|---|---|---|---|---|---|---|---|---|---|
| Higher-order ODU sub-service 1 | o1 | o2 | o3 | o4 | o1 | o2 | o3 | o4 | o1 | o2 | o3 | o4 |
| Higher-order ODU sub-service 2 |  |  |  |  | o3 |  |  |  |  |  |  |  |

| 13 | 14 | 15 | 16 | 17 | 18 | 19 | 20 | 21 | 22 | 23 | 24 |
|---|---|---|---|---|---|---|---|---|---|---|---|
| o1 | o2 | o3 | o4 | o1 | o2 | o3 | o4 | o1 | o2 | o3 | o4 |
| o2 |  |  |  |  |  |  |  | o4 |  |  |  |

FIG. 6(b)

| Timeslot sequence number | 1 | 2 | 3 | 4 | 5 | 6 | 7 | 8 | 9 | 10 | 11 | 12 |
|---|---|---|---|---|---|---|---|---|---|---|---|---|
| Higher-order ODU sub-service 1 | si1 | si2 | si3 | si4 | si1 | si2 | si3 | si4 | si1 | si2 | si3 | si4 |
| Higher-order ODU sub-service 2 | | | | | si3 | | | | | | | |

| 13 | 14 | 15 | 16 | 17 | 18 | 19 | 20 | 21 | 22 | 23 | 24 |
|---|---|---|---|---|---|---|---|---|---|---|---|
| si1 | si2 | si3 | si4 | si1 | si2 | si3 | si4 | si1 | si2 | si3 | si4 |
| si2 | | | | | | | | si4 | | | |

FIG. 6(c)

| Timeslot sequence number | 1 | 2 | 3 | 4 | 5 | 6 | 7 | 8 | 9 | 10 | 11 | 12 |
|---|---|---|---|---|---|---|---|---|---|---|---|---|
| Higher-order ODU sub-service 1 | so2 | so3 | so4 | so1 | so2 | so3 | so4 | so1 | so2 | so3 | so4 | so1 |
| Higher-order ODU sub-service 2 | | | | | so4 | | | | | | | |

| 13 | 14 | 15 | 16 | 17 | 18 | 19 | 20 | 21 | 22 | 23 | 24 |
|---|---|---|---|---|---|---|---|---|---|---|---|
| so2 | so3 | so4 | so1 | so2 | so3 | so4 | so1 | so2 | so3 | so4 | so1 |
| so3 | | | | | | | | so1 | | | |

FIG. 6(d)

| Timeslot sequence number | 1 | 2 | 3 | 4 | 5 | 6 | 7 | 8 | 9 | 10 | 11 | 12 |
|---|---|---|---|---|---|---|---|---|---|---|---|---|
| Higher-order ODU sub-service 1 | o1 | o2 | o3 | o4 | o1 | o2 | o3 | o4 | o1 | o2 | o3 | o4 |
| Higher-order ODU sub-service 2 | o2 | | | | o3 | | | | o4 | | | |

FIG. 7(a)

| Timeslot sequence number | 1 | 2 | 3 | 4 | 5 | 6 | 7 | 8 | 9 | 10 | 11 | 12 |
|---|---|---|---|---|---|---|---|---|---|---|---|---|
| Higher-order ODU sub-service 1 | o1 | o2 | o3 | o4 | o1 | o2 | o3 | o4 | o1 | o2 | o3 | o4 |
| Higher-order ODU sub-service 2 | o2 | | o1 | | o3 | | o1 | | o4 | | o2 | |

FIG. 7(b)

| Timeslot sequence number | 1 | 2 | 3 | 4 | 5 | 6 | 7 | 8 | 9 | 10 | 11 | 12 |
|---|---|---|---|---|---|---|---|---|---|---|---|---|
| Higher-order ODU sub-service 1 | si1 | si2 | si3 | si4 | si1 | si2 | si3 | si4 | si1 | si2 | si3 | si4 |
| Higher-order ODU sub-service 2 | si2 | | si1 | | si3 | | si1 | | si4 | | Si2 | |

FIG. 7(c)

| Timeslot sequence number | 1 | 2 | 3 | 4 | 5 | 6 | 7 | 8 | 9 | 10 | 11 | 12 |
|---|---|---|---|---|---|---|---|---|---|---|---|---|
| Higher-order ODU sub-service 1 | so2 | so3 | so4 | so1 | so2 | so3 | so4 | so1 | so2 | so3 | so4 | so1 |
| Higher-order ODU sub-service 2 | so3 |  | So2 |  | so4 |  | So2 |  | so1 |  | so3 |  |

FIG. 7(d)

| Timeslot sequence number | 1 | 2 | 3 | 4 | 5 | 6 | 7 | 8 | 9 | 10 | 11 | 12 |
|---|---|---|---|---|---|---|---|---|---|---|---|---|
| Higher-order ODU service | o1 | o2 | o1 | o2 | o1 | o2 | o1 | o2 | o1 | o2 | o1 | o2 |

| 13 | 14 | 15 | 16 | 17 | 18 | 19 | 20 | 21 | 22 | 23 | 24 |
|---|---|---|---|---|---|---|---|---|---|---|---|
| o1 | o2 | o1 | o2 | o1 | o2 | o1 | o2 | o1 | o2 | o1 | o2 |

FIG. 8(a)

| Timeslot sequence number | 1 | 2 | 3 | 4 | 5 | 6 | 7 | 8 | 9 | 10 | 11 | 12 |
|---|---|---|---|---|---|---|---|---|---|---|---|---|
| Higher-order ODU service |  |  |  |  |  |  |  | o2 |  |  |  |  |

| 13 | 14 | 15 | 16 | 17 | 18 | 19 | 20 | 21 | 22 | 23 | 24 |
|---|---|---|---|---|---|---|---|---|---|---|---|
|  |  |  | o2 |  |  |  |  |  |  |  | o2 |

FIG. 8(b)

| Timeslot sequence number | 1 | 2 | 3 | 4 | 5 | 6 | 7 | 8 | 9 | 10 | 11 | 12 |
|---|---|---|---|---|---|---|---|---|---|---|---|---|
| Higher-order ODU service | | | | | | | | si2 | | | | |

| 13 | 14 | 15 | 16 | 17 | 18 | 19 | 20 | 21 | 22 | 23 | 24 |
|---|---|---|---|---|---|---|---|---|---|---|---|
| | | | si2 | | | | | | | | si2 |

FIG. 8(c)

| Timeslot sequence number | 1 | 2 | 3 | 4 | 5 | 6 | 7 | 8 | 9 | 10 | 11 | 12 |
|---|---|---|---|---|---|---|---|---|---|---|---|---|
| Higher-order ODU service | | | | | | | | so1 | | | | |

| 13 | 14 | 15 | 16 | 17 | 18 | 19 | 20 | 21 | 22 | 23 | 24 |
|---|---|---|---|---|---|---|---|---|---|---|---|
| | | | so1 | | | | | | | | so1 |

FIG. 8(d)

APPARATUS AND METHOD FOR TRANSPORTING OPTICAL CHANNEL DATA UNIT ODU SERVICE

CROSS-REFERENCE TO RELATED APPLICATIONS

This application is a continuation of International Patent Application No. PCT/CN2013/072768, filed on Mar. 15, 2013, which is hereby incorporated by reference in its entirety.

TECHNICAL FIELD

The present invention relates to the field of communications transmission, and in particular, to an apparatus and a method for transporting an optical channel data unit (Optical channel Data unit, ODU) service.

BACKGROUND

With rapid development of a communications network, the number of service categories, for example, mobile, voice, video, network games, and network browsing, is increasing, and the bandwidth is required to be higher. To transport a service such as a time division multiplexing service, the communications network must perform complex service classification, and simplify a processing process of a switching device, to improve processing efficiency and quality of the switching device.

FIG. 1 is a schematic diagram of a transport apparatus in the prior art. The transport apparatus in the prior art includes a receiving line card, a sending line card, and a switching unit. The receiving line card further includes a GMP (Generic Mapping Procedure, generic mapping procedure) demapping unit. The sending line card further includes a GMP mapping unit. For a received higher-order optical channel data unit (Optical channel Data unit, ODU) service, the GMP demapping unit demaps a bandwidth-variable ODUflex frame in the higher-order ODU service by using the generic mapping procedure, and sends the ODUflex frame to the switching unit. The switching unit interconnects, by using an inter-board bus, non-Ethernet switching units that are constructed. The switching unit sends the received ODUflex frame to the sending line card. The GMP mapping unit in the sending line card maps the received ODUflex frame and encapsulates the received ODUflex frame into the higher-order ODU service, and sends the higher-order ODU service.

In the prior art, the ODUflex frame cannot be transported by using an Ethernet switching unit, and the transport apparatus in the prior art cannot achieve compatibility in an Ethernet switching network.

SUMMARY

The present invention provides an apparatus and a method for transporting an ODU service.

According to a first aspect, an apparatus for transporting a higher-order ODU service is provided, and includes:

a first ODU service processing unit, a timeslot allocation unit, a switching output port allocation unit, an Ethernet switching unit, and a second ODU service processing unit, where the first ODU service processing unit is configured to receive a higher-order ODU frame; perform demapping processing on the higher-order ODU frame to obtain an ODUflex frame; encapsulate the ODUflex frame into an Ethernet frame; and send the Ethernet frame to the Ethernet switching unit according to a table of a mapping between output ports of the first ODU service processing unit and timeslots, where the table is determined by the timeslot allocation unit;

the timeslot allocation unit is configured to determine the table of the mapping between the output ports of the first ODU service processing unit and timeslots;

the switching output port allocation unit is configured to determine a table of a mapping between input ports of the Ethernet switching unit and timeslots in a frame period and a table of a mapping between output ports of the Ethernet switching unit and timeslots in a frame period according to the table of the mapping between the output ports of the first ODU service processing unit and timeslots, where the table is determined by the timeslot allocation unit, and determine an allocation forwarding command of the Ethernet switching unit according to the table of the mapping between the input ports of the Ethernet switching unit and timeslots in a frame period and the table of the mapping between the output ports of the Ethernet switching unit and timeslots in a frame period;

the Ethernet switching unit is configured to forward the received Ethernet frame to the second ODU service processing unit according to the allocation forwarding command of the Ethernet switching unit; and the second ODU service processing unit is configured to perform decapsulation processing on the received Ethernet frame according to the table of the mapping between the output ports of the Ethernet switching unit and timeslots in a frame period, where the table is determined by the switching output port allocation unit, to obtain Ethernet payload bit stream data; encapsulate the Ethernet payload bit stream data into the higher-order ODU frame; and send the higher-order ODU frame.

With reference to the first aspect, in a first possible implementation manner of the first aspect, the timeslot allocation unit is configured to generate one synchronization frame period, determine, according to a rate of the obtained ODUflex frame, an output port rate of the first ODU service processing unit, the synchronization frame period, and a preset Ethernet frame payload length, the number of timeslots in the synchronization frame period that are occupied by the ODUflex frame, and determine, according to an interleaved allocation method, the table of the mapping between the output ports of the first ODU service processing unit and timeslots that includes a mapping between the output ports of the first ODU service processing unit and the timeslots in the synchronization frame period.

With reference to the first aspect or the first possible implementation manner of the first aspect, in a second possible implementation manner of the first aspect, the timeslot allocation unit is configured to generate one synchronization frame period, determine, according to a rate of the obtained ODUflex frame and a mapping between the rate of the ODUflex frame and the number of timeslots in the synchronization frame period that are occupied by the ODUflex frame, the number of timeslots in the synchronization frame period that are occupied by the ODUflex frame, and determine, according to an interleaved allocation method, the table of the mapping between the output ports of the first ODU service processing unit and timeslots that includes the mapping between the output ports of the first ODU service processing unit and the timeslots in the synchronization frame period.

With reference to the first possible implementation manner or the second possible implementation manner of the first aspect, in a third possible implementation manner of the first aspect, the first ODU service processing unit specifically includes an ODUflex demapping unit, an Ethernet encapsulation unit, and a port distribution unit, where the ODUflex demapping unit is configured to receive the higher-order ODU frame; extract overhead information of the higher-order ODU frame; and perform demapping processing on the higher-order ODU frame to obtain the ODUflex frame;

the Ethernet encapsulation unit is configured to determine the rate of the ODUflex frame according to the extracted overhead information, determine a slice length of the ODUflex frame according to the rate of the ODUflex frame, and encapsulate the ODUflex frame into an Ethernet frame according to the determined slice length of the ODUflex frame; and the port distribution unit is configured to send the Ethernet frame to the Ethernet switching unit according to the table of the mapping between the output ports of the first ODU service processing unit and timeslots, where the table is determined by the timeslot allocation unit.

With reference to the first aspect, the first possible implementation manner of the first aspect, the second possible implementation manner of the first aspect, or the third possible implementation manner of the first aspect, in a fourth possible implementation manner of the first aspect, the ODUflex demapping unit is further configured to extract link connection resize information LCR information in the overhead information of the higher-order ODU frame; and the timeslot allocation unit increases, according to information that bandwidth needs to be increased, the number of the timeslots occupied by the ODUflex frame, and generates an adjusted table of the mapping between the output ports of the first ODU service processing unit and timeslots, where the information is indicated by the LCR information; or decreases, according to information that bandwidth needs to be decreased, the number of the timeslots occupied by the ODUflex frame, and generates an adjusted table of the mapping between the output ports of the first ODU service processing unit and timeslots, where the information is indicated by the LCR information.

With reference to the first aspect, the first possible implementation manner of the first aspect, the second possible implementation manner of the first aspect, the third possible implementation manner of the first aspect, or the fourth possible implementation manner of the first aspect, in a fifth possible implementation manner of the first aspect, the timeslot allocation unit is specifically configured to increase, according to the information that bandwidth needs to be increased, the number of the timeslots occupied by the ODUflex frame, and generate the adjusted table of the mapping between the output ports of the first ODU service processing unit and timeslots, where the information is indicated by the link connection resize information LCR information in the overhead information of the received higher-order ODU frame; update a slice length to obtain an updated slice length; and update the updated slice length according to the information that bandwidth needs to be increased, where the information is indicated by bandwidth resize information BWR information in the overhead information of the received ODUflex frame.

With reference to the first aspect, the first possible implementation manner of the first aspect, the second possible implementation manner of the first aspect, the third possible implementation manner of the first aspect, the fourth possible implementation manner of the first aspect, or the fifth possible implementation manner of the first aspect, in a sixth possible implementation manner of the first aspect, the timeslot allocation unit is specifically configured to update, according to the information that bandwidth needs to be decreased, a slice length to obtain an updated slice length, where the information is indicated by the bandwidth resize information BWR information in the overhead information of the received ODUflex frame; and decrease, according to the information that bandwidth needs to be decreased, the number of the timeslots occupied by the ODUflex frame, generate the adjusted table of the mapping between the output ports of the first ODU service processing unit and timeslots, and update the updated slice length, where the information is indicated by the link connection resize information LCR information in the overhead information of the received higher-order ODU frame.

Further, with reference to the first aspect and the multiple possible implementation manners, the apparatus of the present invention may further include a synchronization clock unit, configured to provide a clock signal for the timeslot allocation unit, where the clock signal is used to synchronize a reference time of the synchronization frame period, so that all frame periods generated by the timeslot allocation unit are synchronous in time.

According to a second aspect, a method for transporting an ODU service is provided, and includes:

receiving a higher-order ODU frame; performing demapping processing on the higher-order ODU frame to obtain an ODUflex frame; encapsulating the ODUflex frame into an Ethernet frame; and sending the Ethernet frame to an Ethernet switching unit according to a table of a mapping between output ports of a first ODU service processing unit and timeslots;

forwarding the received Ethernet frame to a second ODU service processing unit according to an allocation forwarding command of the Ethernet switching unit, where the allocation forwarding command of the Ethernet switching unit is determined according to a table of a mapping between input ports of the Ethernet switching unit and timeslots in a frame period and a table of a mapping between output ports of the Ethernet switching unit and timeslots in a frame period, and the table of the mapping between the output ports of the Ethernet switching unit and timeslots in a frame period and the table of the mapping between the output ports of the Ethernet switching unit and timeslots in a frame period are determined according to the table of the mapping between the input ports of the Ethernet switching unit and timeslots in a frame period; and performing decapsulation processing on the received Ethernet frame according to the table of the mapping between the output ports of the Ethernet switching unit and timeslots in a frame period to obtain Ethernet payload bit stream data; encapsulating the Ethernet payload bit stream data into the higher-order ODU frame; and sending the higher-order ODU frame.

With reference to the second aspect, in a first possible implementation manner of the second aspect, the method further includes that the step of the receiving a higher-order ODU frame; performing demapping processing on the higher-order ODU frame to obtain an ODUflex frame; encapsulating the ODUflex frame into an Ethernet frame; and sending the Ethernet frame to the Ethernet switching unit according to a table of a mapping between output ports of a first ODU service processing unit and timeslots is specifically:

receiving the higher-order ODU frame; extracting overhead information of the higher-order ODU frame; and performing demapping processing on the higher-order ODU frame to obtain the ODUflex frame;

determining a rate of the ODUflex frame according to the extracted overhead information, determining a slice length of the ODUflex frame according to the rate of the ODUflex frame, and encapsulating the ODUflex frame into an Ethernet frame according to the determined slice length of the ODUflex frame; and sending the Ethernet frame to the Ethernet switching unit according to the table of the mapping between the output ports of the first ODU service processing unit and timeslots.

With reference to the second aspect or the first possible implementation manner of the second aspect, in a second possible implementation manner of the second aspect, determining of the timeslot mapping table is specifically: generating one synchronization frame period, and determining, according to a rate of the obtained ODUflex frame, an output port rate of the first ODU service processing unit, the synchronization frame period, and a preset Ethernet frame payload length, the number of timeslots in the synchronization frame period that are occupied by the ODUflex frame, and determining, according to an interleaved allocation method, the table of the mapping between the output ports of the first ODU service processing unit and timeslots that includes a mapping between the output ports of the first ODU service processing unit and the timeslots in the synchronization frame period.

With reference to the first possible implementation manner or the second possible implementation manner of the second aspect, in a third possible implementation manner of the second aspect, the determining of the timeslot mapping table is specifically: generating one synchronization frame period, determining, according to a rate of the obtained ODUflex frame and a mapping between the rate of the ODUflex frame and the number of the timeslots in the synchronization frame period that are occupied by the ODUflex frame, the number of the timeslots in the synchronization frame period that are occupied by the ODUflex frame, and determining, according to an interleaved allocation method, the table of the mapping between the output ports of the first ODU service processing unit and timeslots that includes the mapping between the output ports of the first ODU service processing unit and the timeslots in the synchronization frame period.

With reference to the foregoing various possible implementation manners of the second aspect, the method further includes: extracting link connection resize information LCR information in the overhead information of the higher-order ODU frame; and increasing, according to information that bandwidth needs to be increased, the number of the timeslots occupied by the ODUflex frame, and generating an adjusted table of the mapping between the output ports of the first ODU service processing unit and timeslots, where the information is indicated by the LCR information; or decreasing, according to information that bandwidth needs to be decreased, the number of the timeslots occupied by the ODUflex frame, and generating an adjusted table of the mapping between the output ports of the first ODU service processing unit and timeslots, where the information is indicated by the LCR information.

With reference to the foregoing various possible implementation manners of the second aspect, the method further includes that the step of the extracting link connection resize information LCR information in the overhead information of the higher-order ODU frame; and increasing, according to the information that bandwidth needs to be increased, the number of the timeslots occupied by the ODUflex frame, and generating an adjusted table of the mapping between the output ports of the first ODU service processing unit and timeslots, where the information is indicated by the LCR information, is specifically:

increasing, according to the information that bandwidth needs to be increased, the number of the timeslots occupied by the ODUflex frame, and generating the adjusted table of the mapping between the output ports of the first ODU service processing unit and timeslots, where the information is indicated by the link connection resize information LCR information in the overhead information of the received higher-order ODU frame;

updating the slice length to obtain an updated slice length; and updating the updated slice length according to the information that bandwidth needs to be increased, and sending the updated slice length to the first ODU service processing unit, to perform Ethernet frame encapsulation according to the updated slice length, where the information is indicated by bandwidth resize information BWR information in the overhead information of the received ODUflex frame.

With reference to the foregoing various possible implementation manners of the second aspect, the method further includes that the step of the decreasing, according to the information that bandwidth needs to be decreased, the number of the timeslots occupied by the ODUflex frame, and generating an adjusted table of the mapping between the output ports of the first ODU service processing unit and timeslots, where the information is indicated by the LCR information, is specifically:

updating, according to the information that bandwidth needs to be decreased, the slice length to obtain an updated slice length, where the information is indicated by the bandwidth resize information BWR information in the overhead information of the received ODUflex frame; and decreasing, according to the information that bandwidth needs to be decreased, the number of the timeslots occupied by the ODUflex frame, and generating the adjusted table of the mapping between the output ports of the first ODU service processing unit and timeslots, where the information is indicated by the link connection resize information LCR information in the overhead information of the received higher-order ODU frame.

With reference to the foregoing various possible implementation manners of the second aspect, the method further includes: generating a clock signal, where the clock signal is used to synchronize a reference time of the synchronization frame period, so that all frame periods of the synchronization frame period are synchronous in time.

As can be seen, in the embodiments of the present invention, by using a first ODU service processing unit, a timeslot allocation unit, a switching output port allocation unit, an Ethernet switching unit, and a second ODU service processing unit, a higher-order ODU service is forwarded according to a table of a mapping between output ports of the first ODU service processing unit and timeslots and an allocation forwarding command of the Ethernet switching unit, which resolves a problem in the prior art that an ODUflex frame cannot be transported by using the Ethernet switching unit, thereby ensuring that service congestion does not occur on a forwarding port of a transport apparatus, and improving transmission quality of a communications network.

BRIEF DESCRIPTION OF DRAWINGS

Accompanying drawings described herein are used to provide further understanding of the present invention, constitute a part of this application, but does not constitute a limitation on the present invention. In the accompanying drawings:

FIG. 4(a)-4(d) show a timeslot mapping table and a frame period timeslot table that correspond to the second embodiment of the present invention;

FIG. 6(a)-6(d) show a timeslot mapping table and a frame period timeslot table that correspond to the third embodiment of the present invention;

FIG. 7(a)-7(d) show a timeslot mapping table and a frame period timeslot table that correspond to a fourth embodiment of the present invention;

FIG. 8(a)-8(d) show a timeslot mapping table and a frame period timeslot table that correspond to a fifth embodiment of the present invention;

DESCRIPTION OF EMBODIMENTS

For a person of ordinary skill in the art to conveniently understand and implement the present invention, embodiments of the present invention are now described with reference to accompanying drawings. Herein, the schematic embodiments of the present invention and description of the schematic embodiments are used to explain the present invention, but are not used to limit the present invention.

Figure 1:
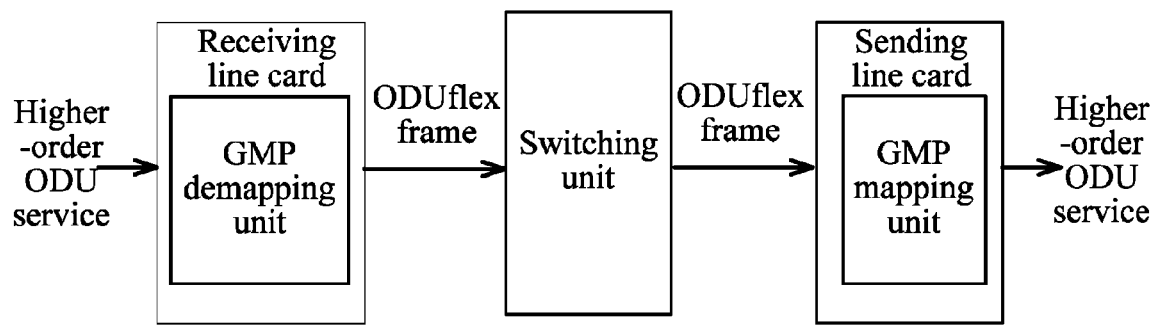
FIG. 1 is a schematic diagram of a switching apparatus in the prior art.
Figure 2:
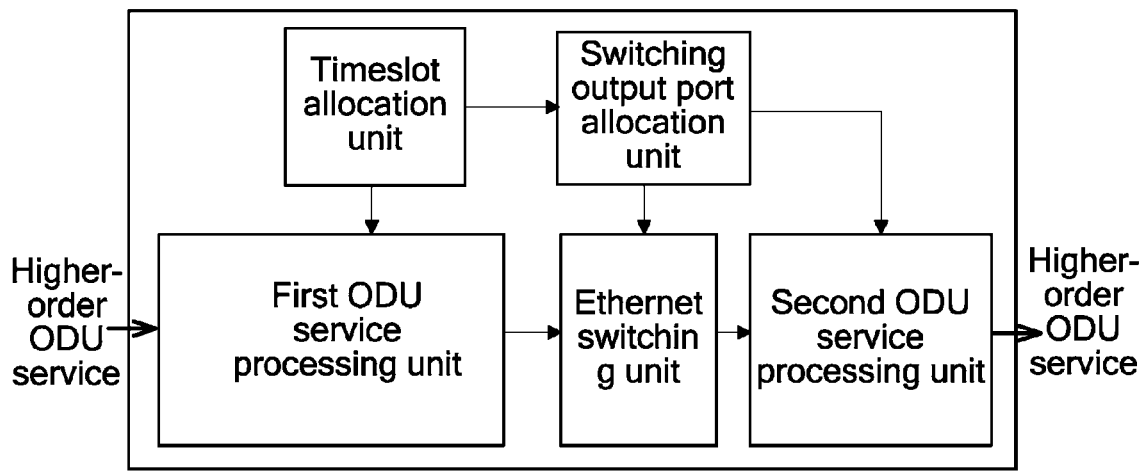
FIG. 2 is a schematic diagram of an apparatus for transporting an ODU service according to a first embodiment of the present invention.

FIG. 2 is a schematic diagram of an apparatus for transporting an ODU service according to a first embodiment of the present invention. The apparatus includes a first ODU service processing unit, a timeslot allocation unit, a switching output port allocation unit, an Ethernet switching unit, and a second ODU service processing unit, where the first ODU service processing unit is configured to convert a received higher-order ODU service into a plurality of Ethernet frames, and send the plurality of encapsulated Ethernet frames to the Ethernet switching unit;

the timeslot allocation unit is configured to determine a table of a mapping between output ports of the first ODU service processing unit and timeslots, to control a process in which the first ODU service processing unit sends an Ethernet frame to the Ethernet switching unit;

the switching output port allocation unit is configured to determine a table of a mapping between output ports of the Ethernet switching unit and timeslots in a frame period, to control an Ethernet decapsulation process of the second ODU service processing unit; and determine an allocation forwarding command of the Ethernet switching unit, to control a switching process of the Ethernet switching unit;

the Ethernet switching unit is configured to switch data, which is received from the first ODU service processing unit, to the second ODU service processing unit according to the allocation forwarding command of the Ethernet switching unit; and the second ODU service processing unit is configured to restore the received Ethernet frame to a higher-order ODU frame according to the table of the mapping between the output ports of the Ethernet switching unit and timeslots in a frame period, where the table is determined by the switching output port allocation unit.

Figure 5:
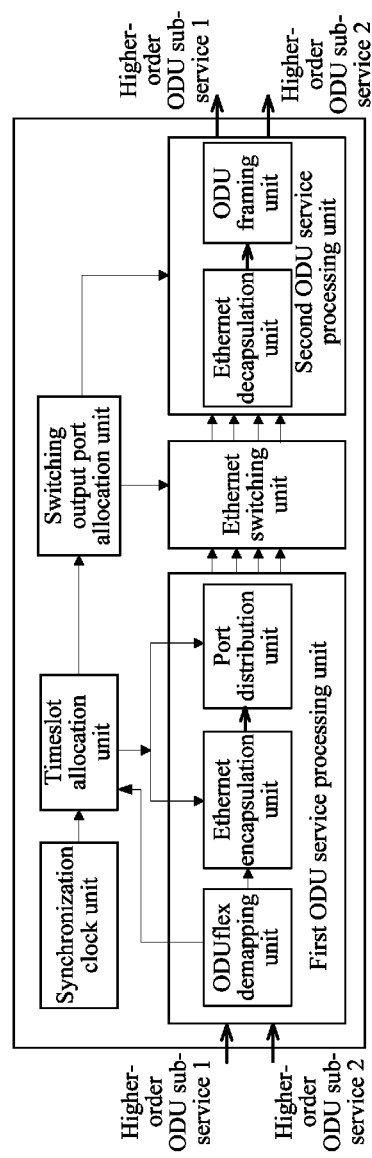
FIG. 5 is a schematic diagram of an apparatus for transporting an ODU service according to a third embodiment of the present invention.

In the embodiment of the present invention, the higher-order ODU service received by the first ODU service processing unit may be at least two higher-order ODU sub-services, and the at least two higher-order ODU sub-services may be higher-order ODU services of different types, as shown in FIG. 5.

In the embodiment of the present invention, there may be two or more first ODU service processing units and two or more second ODU service processing units. Each first ODU service processing unit is connected to each second ODU service processing unit by using the Ethernet switching unit, and data received by each first ODU service processing unit is switched to a corresponding second ODU service processing unit by using the Ethernet switching unit; and a process in which data is distributed on an output port of each first ODU service processing unit is controlled by the timeslot allocation unit, and a process in which each second ODU service processing unit decapsulates the Ethernet frame is controlled by the switching output port allocation unit. In a case of a plurality of first ODU service processing units and/or a plurality of second ODU service processing units, the device further includes a synchronization clock unit, configured to provide a clock signal for the timeslot allocation unit, to synchronize a reference time of a synchronization frame period generated by the timeslot allocation unit, so that all frame periods generated by the timeslot allocation unit are synchronous in time, and synchronization of service processing of each first ODU service processing unit, the switching unit, and each second ODU service processing unit is ensured.

The number of timeslots in a synchronization frame period may be set to an integral number of timeslots by service type. The synchronization frame period may be formed by several Ethernet frame timeslots. The number of the Ethernet frame timeslots forming the synchronization frame period must be greater than or equal to the number of the output ports of the first ODU service processing unit, and less than 1000, that is, the number of the Ethernet frame timeslots forming the synchronization frame period generally has an order of magnitude of dozens or hundreds. By using a timeslot interleaved allocation algorithm, the timeslot allocation unit ensures discreteness and uniformity of allocating ODU services to the timeslots in the synchronization frame period.

By using the timeslot interleaved allocation algorithm, the timeslot allocation unit ensures the discreteness and the uniformity of allocating the ODU services to the timeslots in the synchronization frame period. The switching output port allocation unit ensures, according to the timeslot interleaved allocation algorithm, timeslot allocation for an input interface and an output interface of the Ethernet switching unit, so that the Ethernet switching unit forwards the received Ethernet frame to the second ODU service processing unit according to the allocation forwarding command of the Ethernet switching unit generated by the switching output port allocation unit.

In the embodiment of the present invention, by using a first ODU service processing unit, a timeslot allocation unit, a switching output port allocation unit, an Ethernet switching unit, and a second ODU service processing unit, a higher-order ODU service is forwarded according to a table of a mapping between output ports of the first ODU service processing unit and timeslots and an allocation forwarding command of the Ethernet switching unit, which resolves a problem in the prior art that an ODUflex frame cannot be transported by using the Ethernet switching unit, thereby ensuring that service congestion does not occur on a forwarding port of a transport apparatus, and improving transmission quality of a communications network.

Figure 3:
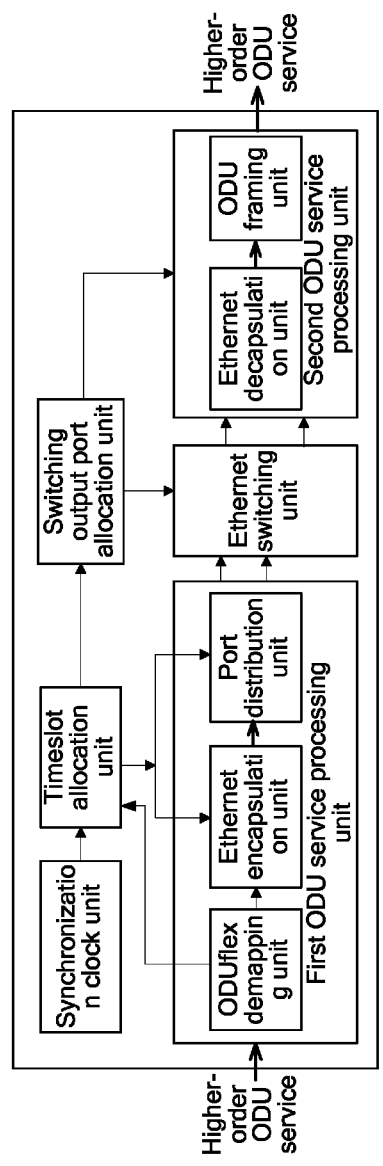
FIG. 3 is a schematic diagram of an apparatus for transporting an ODU service according to a second embodiment of the present invention.

FIG. 3 is a schematic diagram of an apparatus for transporting an ODU service according to a second embodiment of the present invention. The apparatus includes a synchronization clock unit, a first ODU service processing unit, a timeslot allocation unit, a switching output port allocation unit, an Ethernet switching unit, and a second ODU service processing unit.

The synchronization clock unit is configured to provide a clock signal for the timeslot allocation unit, where the clock signal is used to synchronize a reference time of a synchronization frame period, so that all frame periods generated by the timeslot allocation unit are synchronous in time.

The first ODU service processing unit in the embodiment of the present invention may specifically include an ODUflex demapping unit, an Ethernet encapsulation unit, and a port distribution unit. The ODUflex demapping unit is configured to receive a higher-order ODU frame, and perform demapping processing on the higher-order ODU frame to obtain an ODUflex frame; further, the ODUflex demapping unit may further extract overhead information of the higher-order ODU frame, where the extracted overhead information is used to determine a rate of the ODUflex frame; the Ethernet encapsulation unit is configured to encapsulate the ODUflex frame into an Ethernet frame according to a slice length of the obtained ODUflex frame, where the slice length of the ODUflex frame, or the length of ODUflex encapsulated in each Ethernet frame may be obtained through calculation, or may be obtained through table lookup by the Ethernet encapsulation unit according to the rate of the obtained ODUflex frame. A specific process of obtaining through calculation and a specific process of the table lookup are described in details in the following. The rate of the ODUflex frame may be determined according to the overhead information extracted by an ODUflex demapping unit, may also be determined by the ODUflex demapping unit according to the extracted overhead information and then provided for the Ethernet encapsulation unit, may also be determined and then provided for the Ethernet encapsulation unit by another device or functional unit except the apparatus for transporting an ODU service described in this embodiment, and may also be determined and then provided for the Ethernet encapsulation unit by a functional unit inside the apparatus for transporting an ODU service described in this embodiment, or another obtaining method may also be used; the port distribution unit is configured to send the Ethernet frame to an input port of the Ethernet switching unit through a corresponding output port in a determined timeslot according to a table of a mapping between output ports of the first ODU service processing unit and timeslots, where the table is determined by the timeslot allocation unit.

The timeslot allocation unit is configured to generate the table of the mapping between the output ports of the first ODU service processing unit and timeslots that includes a mapping between the output ports of the first ODU service processing unit and timeslots in a synchronization frame period. Specifically, the timeslot allocation unit generates a synchronization frame period according to the clock signal provided by the synchronization clock unit, determines the number of timeslots in the synchronization frame period that are occupied by the ODUflex frame, and determines, according to an interleaved allocation method, the mapping between the output ports of the first ODU service processing unit and the timeslots in the synchronization frame period, that is, the table of the mapping between the output ports of the first ODU service processing unit and timeslots.

Specifically, the number of the timeslots in the synchronization frame period that are occupied by the ODUflex frame may be determined through calculation, and this process may be implemented by using, but not limited to, the following embodiment: a synchronization frame period is set to include 12 Ethernet frame timeslots, a payload length of each Ethernet frame timeslot is 256 bytes, a payload transport bandwidth of each output port of the first ODU service processing unit (an interface between a line card on which the first ODU service processing unit is located and the switching unit) is 6 Gbps, a duration of each Ethernet frame timeslot is 341.333 ns, and 2929687.5 timeslots are sent on one output port of the first ODU service processing unit (hereinafter referred to as the output port) every second, that is, (2929687.5/12=244140.625) frame periods may be sent on one output port; if the rate of the received ODUflex frame is 1.2 Gps, it is obtained through calculation that 1.2*1000*1000*1000/8=150000000 bytes need to be transported every second, and 150000000/244140.625=614.4 bytes need to be transported in each output port frame period; if the 256-byte payload length is used for encapsulation, 614.4/256=2.4 Ethernet frames are required; the number of Ethernet frame timeslots must be an integer, and therefore it is obtained through calculation that the 1.2 G ODUflex requires three Ethernet frame timeslots for encapsulation, and the number of bytes of ODUflex encapsulated in each Ethernet frame is 614.4/3=204.8 bytes; the length of the ODUflex encapsulated in each Ethernet frame is an integer, and therefore the length of the ODUflex encapsulated in each Ethernet frame is 204 bytes or 205 bytes, that is, the slice length of the ODUflex frame is 204 bytes or 205 bytes. According to this principle, it may be obtained through calculation that, for ODUflex whose rate is 2.4 Gps, in the case described above (the frame period is 4095.966 ns, the number of the timeslots in the frame period is 12, the payload length of the Ethernet frame timeslot is 256 bytes, and the payload transport bandwidth of each output port is 6 Gbps), six Ethernet frame timeslots are required for encapsulation, and the length of the ODUflex encapsulated in each Ethernet frame is 204 bytes or 205 bytes.

However, in a case in which for ODUflex whose rate is 1.2 Gps, the frame period includes 24 Ethernet frame timeslots, the payload length of each Ethernet frame timeslot is 256 bytes, the bandwidth of the output port is 12 Gbps, and the duration of each Ethernet frame timeslot is 341.333 ns, it may be obtained through calculation that 5859375 timeslots are sent on one output port every second, that is, (5859375/24=244140.625) frame periods may be sent on one sending interface every second; it is obtained, through calculation according to the rate 1.2 Gbps of the ODUflex, that 1200000*1000/8=150000000 bytes need to be transported every second, and then 150000000/244140.625=614.4 bytes need to be transported in each interface frame period; if the 256-byte payload length is used for encapsulation, 614.4/256=2.4 Ethernet frames are required, that is, the ODUflex requires three Ethernet frame timeslots for encapsulation, and the number of bytes of the ODUflex encapsulated in each Ethernet frame is 614.4/3=204.8 bytes, and therefore the length of the ODUflex encapsulated in each Ethernet frame is 204 bytes or 205 bytes. By analogy, the numbers of timeslots in the synchronization frame period that are occupied in different cases by an ODUflex frame of another rate and the length of the ODUflex encapsulated in the Ethernet frame can be obtained through calculation. It should be noted that, a duration of the synchronization frame period, a duration of each timeslot in the synchronization frame period, and the number of bytes of the ODUflex encapsulated in each Ethernet frame are all set, and may be specifically set according to a specific case. The foregoing is only exemplary, and in specific implementation, numerical values are not limited to those set above.

The timeslot allocation unit may also determine, not through calculation but by searching for a pre-configured mapping between the rate of the ODUflex frame and the number of the timeslots in the synchronization frame period that are occupied by the ODUflex frame, the number of the timeslots in the synchronization frame period that are occupied by the ODUflex frame. This mapping may further include the length of the ODUflex encapsulated in the Ethernet frame. The mapping between the rate of the ODUflex frame, the number of the timeslots in the synchronization frame period that are occupied by the ODUflex frame, and the length of the ODUflex encapsulated in the Ethernet frame may be configured during device initialization, and corresponding configuration is performed according to the length of the frame period and the number of the timeslots that are configured. Specific data of the mapping table may be determined through calculation according to the foregoing calculation method in advance, which is not described herein again. For example, content of the mapping table is shown as follows:

| Rate of the ODUflex Frame | Number of the Occupied Timeslots |
|---|---|
| 1.2 Gbps | 3 |
| 2.4 Gbps | 6 |
| ... | ... |
| 9.6 Gbps | 24 |

After determining the number of the timeslots occupied by the ODUflex frame, the timeslot allocation unit allocates timeslots to each output port by using a timeslot interleaved allocation algorithm. In this way, discreteness and uniformity of allocating ODUflex services to the timeslots in the synchronization frame period are ensured, and at the same time, traffic balance of the output ports of the first ODU service processing unit can also be ensured, thereby reducing impact of a timeslot conflict.

Further, in the embodiment of the present invention, the ODUflex demapping unit may further be configured to extract resize control overhead information RCOH (Resize Control Overhead) information in the overhead information of the higher-order ODU frame. The timeslot allocation unit may further adjust, according to the extracted RCOH information, the number of the timeslots occupied by the ODUflex frame, and generate an adjusted table of the mapping between the output ports of the first ODU service processing unit and timeslots. The first ODU service processing unit sends the Ethernet frame to the Ethernet switching unit according to the adjusted table of the mapping between the output ports of the first ODU service processing unit and timeslots.

The switching output port allocation unit in the embodiment of the present invention is configured to determine a table of a mapping between the input ports of the Ethernet switching unit and timeslots in a frame period and a table of a mapping between the output ports of the Ethernet switching unit and timeslots in a frame period according to a table of a mapping between the output ports of the first ODU service processing unit and timeslots, where the table is determined by the timeslot allocation unit, and determine an allocation forwarding command of the Ethernet switching unit according to the table of the mapping between the input ports of the Ethernet switching unit and timeslots in a frame period and the table of the mapping between the output ports of the Ethernet switching unit and timeslots in a frame period.

The second ODU service processing unit in the embodiment of the present invention may include an Ethernet decapsulation unit and an ODU framing unit. The Ethernet decapsulation unit is configured to perform decapsulation processing on the received Ethernet frame according to the table of the mapping between the output ports of the Ethernet switching unit and timeslots in a frame period, where the table is determined by the switching output port allocation unit, to obtain Ethernet payload bit stream data; and the ODU framing unit is configured to encapsulate the Ethernet payload bit stream data into the higher-order ODU frame and send the higher-order ODU frame.

Further, the embodiment of the present invention is similar to the first embodiment, and may include two or more first ODU service processing units and/or two or more second ODU service processing units. The first ODU service processing units/second ODU service processing units have a same function, which is not described herein again; the timeslot allocation unit and the switching output port allocation unit are shared by all the first ODU service processing units and the second ODU service processing units. The timeslot allocation unit controls each first ODU service processing unit to send a converted Ethernet frame of each higher-order ODU service to the Ethernet switching unit. The switching output port allocation unit controls an Ethernet decapsulation process of each second ODU service processing unit.

FIG. 4(a)-4(d) show the table of the mapping between the output ports of the first ODU service processing unit and timeslots, where the table is determined by the timeslot allocation unit and the table of the mapping between the input ports of the Ethernet switching unit and timeslots in a frame period and the table of the mapping between the output ports of the Ethernet switching unit and timeslots in a frame period, where the tables are determined by the switching output port allocation unit in the second embodiment of the present invention. The embodiment of the present invention uses an example in which the number of the timeslots in the synchronization frame period is 12, the number of the output ports of the first ODU service processing unit is 2, the payload length of each Ethernet frame is 256 bytes, and the output port rate of the first ODU service processing unit is 6 Gbps. The higher-order ODU service includes ODU1, ODU2, ODU3, and ODU4, whose rates are 2.5 Gbit/s, 10 Gbit/s, 40 Gbit/s, and 100 Gbit/s respectively.

The timeslot allocation unit determines, according to the number 12 of the timeslots in the synchronization frame period and the rate 1.2 Gbps of ODUflex carried in the higher-order ODU service, that the ODUflex requires three Ethernet frames for encapsulation, that is, the ODUflex occupies three of the timeslots in the entire synchronization frame period. For a specific calculation process, refer to the foregoing description. Certainly, in the embodiment of the present invention, a person in the art knows that the first ODU service processing unit, or modules or functional units (for example, the ODUflex demapping unit and the Ethernet encapsulation unit) in the first ODU service processing unit may also determine a slice length of the ODUflex frame, for example, determine, through table lookup according to the rate of the obtained ODUflex frame, the length of the ODUflex encapsulated in each Ethernet frame; and the specific process is similar to that of the foregoing embodiment, and is not described herein again. The timeslot allocation unit allocates timeslots to each output port according to a timeslot interleaved allocation method. In a case in which multiple ODU services exist, timeslots are first allocated to the ODUflex with a higher rate according to a principle of first allocating timeslots to a service with higher bandwidth.

FIG. 4(a) shows the table of the mapping between the output ports of the first ODU service processing unit and timeslots, where the table is determined by the timeslot allocation unit. As shown in FIG. 4(a), locations of timeslots 1, 5, and 9 correspond to output ports o1, o2, and o1 of the first ODU service processing unit respectively. The first ODU service processing unit sends an Ethernet frame to a corresponding input port of the Ethernet switching unit respectively by using the output ports o1, o2, and o1 in the timeslots 1, 5, and 9 according to the timeslot mapping table shown in FIG. 4(a).

When the rate of the ODUflex carried in the higher-order ODU service increases, for example, increases from 1.2 Gbps to 2.4 Gbps, the ODUflex demapping unit obtains resize control overhead information RCOH information in the higher-order ODU frame. In the embodiment of the present invention, the resize control overhead information in the higher-order ODU frame is link connection resize information (Link Connection Resize, LCR), and resize control overhead information of the ODUflex frame is bandwidth resize information (Bandwidth Resize, BWR). The embodiment of the present invention uses an example in which information carried in the LCR indicates that a rate of the ODUflex doubles. The timeslot allocation unit generates, through adjustment according to the LCR information of the higher-order ODU frame and based on a timeslot interleaved allocation method, an adjusted timeslot mapping table corresponding to that the rate of the ODUflex doubles, as shown in FIG. 4(b). The first ODU service processing unit sends the Ethernet frame to the Ethernet switching unit according to the adjusted timeslot mapping table.

As shown in FIG. 4(b), three distribution timeslots 3, 7, and 11 are added for the output ports of the first ODU service processing unit, that is, in one synchronization frame period, the number of the output ports is doubled, so that the ODUflex frame with an increased rate can be encapsulated into an Ethernet frame, and the Ethernet frame is sent. The following implementation manner may specifically be adopted for a process of adjusting timeslots and encapsulation:

An overhead of a higher-order ODU carrying the ODUflex carries the LCR information. Advertisement information includes the following: an ODUflex bandwidth needs to be increased, the number of channels of the higher-order ODU carrying the ODUflex doubles (that is, the channels of the higher-order ODU carrying the ODUflex refer to 80 small channels of ODU4 or 32 small channels of ODU3 or eight small channels of ODU2), switching bearer bandwidth inside a node is required to increase first (that is, the number of Ethernet frame timeslots of an interface frame period in which the ODUflex is loaded needs to increase first), and because the number of the channels of the higher-order ODU carrying the ODUflex doubles, the switching bearer bandwidth inside the node also needs to double, that is, the number of the Ethernet frame timeslots needs to double; that is, the timeslot allocation unit doubles, according to LCR information indicating that the bandwidth doubles in the overhead of the higher-order ODU carrying the ODUflex, the number of the timeslots occupied by the ODUflex frame, that is, adjusts the number to 6; and allocates the newly added timeslots according to an interleaved allocation method, and determines an adjusted table of the mapping between the output ports of the first ODU service processing unit and timeslots.

For a better transport effect, for example, implementing smaller jitter, an Ethernet encapsulation process may be further adjusted at the same time. That is, after the above-described adjustment of the table of the mapping between the output ports of the first ODU service processing unit and timeslots, the rate of the ODUflex does not change immediately, that is, it is still 1.2 Gps, and therefore the number of bytes of the ODUflex that need to be sent in one interface frame period is still 614.4 bytes. Currently, the switching bearer bandwidth inside the node doubles (that is, six Ethernet frame timeslots are required in one frame period), and therefore it can be calculated that 614.4/6=102.4 bytes of the ODUflex are encapsulated in the Ethernet frame at this time. The length of bytes of the ODUflex encapsulated in the Ethernet frame is an integer, and therefore the length of the ODUflex encapsulated in each Ethernet frame is adjusted to 102 bytes or 103 bytes. When BWR information in the overhead of the ODUflex carried in a received higher-order ODU service indicates that the ODUflex bandwidth doubles, that is, at this time, the rate of the ODUflex changes to 2.4 Gps, the number of the bytes of the ODUflex that need to be sent in one interface frame period changes to 1228.8 bytes. Currently, the switching bearer bandwidth inside the node is six Ethernet frame timeslots, and therefore the number of the bytes of the ODUflex encapsulated in each Ethernet frame is 204.8 bytes, that is, the number of the bytes of the ODUflex encapsulated in each Ethernet frame is readjusted to 204 or 205. That is, the better transport effect can be achieved by adjusting the encapsulation process twice.

FIG. 4(c) and FIG. 4(d) respectively show a table of a mapping between the input ports of the Ethernet switching unit and timeslots in a frame period and a table of a mapping between the output ports of the Ethernet switching unit and timeslots in a frame period, where the tables are generated by the switching output port allocation unit according to the foregoing adjusted timeslot mapping table. The Ethernet switching unit has two service input ports si1/si2 and two service output ports so1/so2. In the embodiment of the present invention, a location of timeslot 1 in the table of the mapping between the input ports of the Ethernet switching unit and timeslots in a frame period corresponds to input port si1 of the Ethernet switching unit, and subsequently timeslots numbered 3, 5, 7, 9, and 11 respectively correspond to the input ports si2, si2, si1, si1, and si2 of the Ethernet switching unit according to a principle of interleaved allocation. The switching output port allocation unit determines the table of the mapping between the output ports of the Ethernet switching unit and timeslots in a frame period according to a switching feature of the Ethernet switching unit connected to the switching output port allocation unit, that is, as shown in the figure, the location of timeslot 1 in the table of the mapping between the output ports of the Ethernet switching unit and timeslots in a frame period corresponds to the output port so2 of the Ethernet switching unit, and subsequently the timeslots numbered 3, 5, 7, 9, and 11 are respectively fixed time sequences s01, s01, so2, so2, and s01 in the figure according to the principle of interleaved allocation.

In the embodiment of the present invention, by using a first ODU service processing unit, a timeslot allocation unit, a switching output port allocation unit, an Ethernet switching unit, and a second ODU service processing unit, a higher-order ODU service is forwarded according to a table of a mapping between output ports of the first ODU service processing unit and timeslots and an allocation forwarding command of the Ethernet switching unit, which resolves a problem in the prior art that an ODUflex frame cannot be transported by using the Ethernet switching unit, thereby ensuring that service congestion does not occur on a forwarding port of a transport apparatus, and improving transmission quality of a communications network.

FIG. 5 is a schematic diagram of an apparatus for transporting an ODU service according to a third embodiment of the present invention. The apparatus includes a synchronization clock unit, a first ODU service processing unit, a timeslot allocation unit, a switching output port allocation unit, an Ethernet switching unit, and a second ODU service processing unit. For detailed description of functional modules of the apparatus, refer to the foregoing description of the apparatus for adjusting an ODU service in the second embodiment of the present invention. In the embodiment of the present invention, a higher-order ODU service includes at least two higher-order ODU sub-services, for example, higher-order ODU sub-service 1 and higher-order ODU sub-service 2.

FIG. 6(a)-(d) show a timeslot mapping table and a frame period timeslot table that correspond to the third embodiment of the present invention. In the third embodiment of the present invention, the number of timeslots in a synchronization frame period in the embodiment of the present invention is 24, a service type is two ODU services, namely, higher-order ODU sub-service 1 carrying an ODUflex frame and higher-order ODU sub-service 2 carrying an ODUflex frame. In the embodiment of the present invention, the first ODU service processing unit has four output ports o1, o2, o3, and o4. FIG. 6(a) shows a table of a mapping between the output ports of the first ODU service processing unit and timeslots. As shown in FIG. 6(a), in the embodiment of the present invention, a payload length of each Ethernet frame is 256 bytes, and a transmission rate of each output port of the first ODU service processing unit is 12 Gbps. The timeslot allocation unit determines, according to the number 24 of the timeslots in the synchronization frame period and rates 9.6 Gbps and 2.4 Gbps of ODUflex respectively carried in the two higher-order ODU sub-services, that the ODUflex in higher-order ODU sub-service 1 requires 24 Ethernet frames for encapsulation, that is, the number of the timeslots in the synchronization frame period that need to be occupied by the ODUflex frame whose rate is 9.6 Gbps is 24, while the ODUflex in higher-order ODU sub-service 2 occupies six of the timeslots in the entire synchronization frame period, that is, the number of the timeslots in the synchronization frame period that need to be occupied by the ODUflex frame whose rate is 2.4 Gbps is 6. According to a principle of first allocating the timeslots to a service with high bandwidth, for higher-order ODU sub-service 1, timeslots 1 to 24 respectively corresponding to the output ports o1, o2, o3, o4, o1, o2, o3 . . . o2, o3, and o4 of the first ODU service processing unit are allocated; and for higher-order ODU sub-service 2, the timeslots 1, 5, 9, 13, 17, and 21 respectively corresponding to the output ports o2, o3, o4, o2, o3, and o4 of the first ODU service processing unit are allocated. The first ODU service processing unit sends Ethernet frames to the Ethernet switching unit according to the timeslot mapping table shown in FIG. 6(a) and at locations of the output ports corresponding to the timeslots.

In the embodiment of the present invention, an ODUflex demapping unit obtains resize control overhead information RCOH information in a higher-order ODU frame. It is learned, according to link connection resize information (Link Connection Resize, LCR) in the ODU frame, that a rate of the ODUflex carried in higher-order ODU sub-service 1 does not change, and a rate of the ODUflex carried in higher-order ODU sub-service 2 halves, decreasing from 2.4 Gbps to 1.2 Gbps. Then, the timeslot allocation unit halves the number of allocated timeslots, and generates, through adjustment by using a method similar to that in the second embodiment, an adjusted timeslot mapping table FIG. 6(b), corresponding to the output ports of the first ODU service processing unit. The first ODU service processing unit sends the Ethernet frame to the Ethernet switching unit according to the adjusted timeslot mapping table.

As shown in FIG. 6(b), at locations of timeslots 1, 9, and 17 corresponding to higher-order ODU sub-service 2, three output ports o2, o4, and o3 of the first ODU service processing unit are deleted, that is, in one synchronization frame period, the number of output ports halves, and the number of output ports changes from the original 6 (o2, o3, o4, o2, o3, and o4) to 3 (o3, o2, and o4), so that the ODUflex frame with a decreased rate can be encapsulated into an Ethernet frame, and the Ethernet frame is sent. The output ports of the first ODU service processing unit in the timeslots corresponding to higher-order ODU sub-service 1 remain unchanged. A process of adjusting timeslots and encapsulation is specifically as follows:

An overhead of the ODUflex frame carries LCR information. Advertisement information includes the following: ODUflex bandwidth halves, and then switching bearer bandwidth inside a node (this apparatus for transporting an ODU service) halves (that is, the number of Ethernet frame timeslots of an interface frame period in which the ODUflex is loaded halves), and then the number of the timeslots occupied by the ODUflex frame is halved, that is, adjusted from 6 to 3; and the newly added timeslots are allocated according to the interleaved allocation method, and an adjusted table of the mapping between the output ports of the first ODU service processing unit and timeslots is determined.

For a better transport effect, for example, implementing smaller jitter, an Ethernet encapsulation process may be further adjusted at the same time. That is, before the above-described adjustment of the table of the mapping between the output ports of the first ODU service processing unit and timeslots, an overhead of the ODUflex frame carries a BWR message; and the advertisement information includes the following: the ODUflex bandwidth halves, switching bearer bandwidth inside a node is required to remain unchanged first (that is, the number of Ethernet frame timeslots of an interface frame period in which the ODUflex is carried is still 6): currently, the rate of the ODUflex changes to 1.2 Gps, and therefore the number of bytes of the ODUflex that need to be sent in one interface frame period changes to 614.4 bytes, and currently the switching bearer bandwidth inside the node remains unchanged and is still six Ethernet frame timeslots, and therefore the number of the bytes of the ODUflex encapsulated in each Ethernet frame is 102.4 bytes, that is, the number of the bytes of the ODUflex encapsulated in each Ethernet frame is adjusted from the original 204/205 to 102/103; however, after the table of the mapping between the output ports of the first ODU service processing unit and timeslots is adjusted, the switching bearer bandwidth inside the device halves, decreasing from six Ethernet frame timeslots to three Ethernet frame timeslots, and then the rate of the ODUflex is 1.2 Gps, the number of the bytes of the ODUflex that need to be sent in one interface frame period is 614.4 bytes, and three Ethernet frames are used for encapsulation, and therefore the number of the bytes of the ODUflex encapsulated in each Ethernet frame is 204.8, that is, the number of the bytes of the ODUflex encapsulated in each Ethernet frame is adjusted to 204 or 205. That is, the better transport effect can be achieved by adjusting the encapsulation process twice.

The timeslot allocation unit is specifically configured to update a slice length according to information that bandwidth needs to be decreased, and send the updated slice length to the first ODU service processing unit, to perform Ethernet frame encapsulation according to the updated slice length, where the information is indicated by bandwidth resize information BWR information in the overhead information of the received ODUflex frame. In the embodiment of the present invention, the slice length of the ODUflex frame encapsulated in the Ethernet frame before the updating is 204 bytes or 205 bytes, and the slice length of the ODUflex frame encapsulated in the Ethernet frame after the updating is 102 bytes or 103 bytes; and the slice length of the ODUflex frame encapsulated in the Ethernet frame after second updating is 204 bytes or 205 bytes.

FIG. 6(c) and FIG. 6(d) respectively show a table of a mapping between the input ports of the Ethernet switching unit and timeslots in a frame period and a table of a mapping between the output ports of the Ethernet switching unit and timeslots in a frame period, where the tables are generated by the switching output port allocation unit according to the foregoing adjusted timeslot mapping table. The Ethernet switching unit has four service input ports si1, si2, si3, and si4 and four service output ports so1, so2, so3, and so4. In the embodiment of the present invention, at locations of timeslots 1 to 24 in the table of the mapping between the input ports of the Ethernet switching unit and timeslots in a frame period, higher-order ODU sub-service 1 corresponds to input ports si1, si2, si3, si4 . . . si1, si2, si3, and si4 of the Ethernet switching unit. At locations of timeslots 5, 13, and 21, higher-order ODU sub-service 2 corresponds to input ports si3, si2, and si4 of the Ethernet switching unit, that is, in the corresponding timeslots and on the corresponding input ports of the Ethernet switching unit, the Ethernet switching unit receives and forwards Ethernet frames to the second ODU service processing unit. Accordingly, at locations of timeslots 1 to 24 in the table of the mapping between the output ports of the Ethernet switching unit and timeslots in a frame period, higher-order ODU sub-service 1 corresponds to output ports so2, so3, so4, so1 . . . so2, so3, so4, and so1 of the Ethernet switching unit; and at locations of timeslots 5, 13, and 21, higher-order ODU sub-service 2 corresponds to output ports so4, so3, and so1 of the Ethernet switching unit.

In specific implementation, the switching output port allocation unit generates the table of the mapping between the input ports of the Ethernet switching unit and timeslots in a frame period and the table of the mapping between the output ports of the Ethernet switching unit and timeslots in a frame period according to the timeslot mapping table generated by the timeslot allocation unit, and determines an allocation forwarding command of the Ethernet switching unit according to the table of the mapping between the input ports of the Ethernet switching unit and timeslots in a frame period and the table of the mapping between the output ports of the Ethernet switching unit and timeslots in a frame period. The Ethernet switching unit sends an Ethernet frame to the second ODU service processing unit according to the received allocation forwarding command of the Ethernet switching unit. The second ODU service processing unit is configured to perform decapsulation processing on the received Ethernet frame according to the table of the mapping between the output ports of the Ethernet switching unit and timeslots in a frame period, where the table is determined by the switching output port allocation unit, to obtain Ethernet payload bit stream data; encapsulate the Ethernet payload bit stream data into the higher-order ODU frame; and send the higher-order ODU frame.

In the embodiment of the present invention, by using a first ODU service processing unit, a timeslot allocation unit, a switching output port allocation unit, an Ethernet switching unit, and a second ODU service processing unit, a higher-order ODU service is forwarded according to a table of a mapping between output ports of the first ODU service processing unit and timeslots and an allocation forwarding command of the Ethernet switching unit, which resolves a problem in the prior art that an ODUflex frame cannot be transported by using the Ethernet switching unit, thereby ensuring that service congestion does not occur on a forwarding port of a transport apparatus, and improving transmission quality of a communications network.

FIG. 7(a)-7(d) shows a timeslot mapping table and a frame period timeslot table that correspond to a fourth embodiment of the present invention. For a schematic diagram of an apparatus for transporting an ODU service according to the fourth embodiment of the present invention, refer to the schematic diagram of the apparatus for transporting an ODU service shown in FIG. 5. In the fourth embodiment of the present invention, the number of timeslots in a synchronization frame period is 12, and a service type is two ODU services, namely, higher-order ODU sub-service 1 and higher-order ODU sub-service 2. In the embodiment of the present invention, the first ODU service processing unit has four output ports o1, o2, o3, and o4. A major difference between this embodiment and the second embodiment is that, a device in the present invention receives at least two higher-order ODU services, and the first ODU service processing unit has four output ports, and therefore the embodiment of the present invention is basically the same as the second embodiment in processing implementation except that the two factors are involved; for what is not clearly described in this embodiment, refer to the second embodiment. FIG. 7(a) shows a table of a mapping between the output ports of the first ODU service processing unit and timeslots. As shown in FIG. 7(a), in the embodiment of the present invention, a payload length of each Ethernet frame is 256 bytes, and a transmission rate of each output port of the first ODU service processing unit is 6 Gbps. The timeslot allocation unit determines, according to the number 12 of timeslots in the synchronization frame period and rates 4.8 Gbps and 1.2 Gbps of ODUflex respectively carried in the two higher-order ODU sub-services, that in one synchronization frame period, the ODUflex in higher-order ODU sub-service 1 requires 12 Ethernet frames for encapsulation, that is, the ODUflex occupies 12 of the number of the timeslots in the entire synchronization frame period; and that the ODUflex in higher-order ODU sub-service 2 requires three Ethernet frames for encapsulation, that is, the ODUflex in higher-order ODU sub-service 2 occupies three of the timeslots in the entire synchronization frame period. As shown in FIG. 7(a), at locations of timeslots 1 to 12, higher-order ODU sub-service 1 corresponds to output ports o1, o2, o3, o4 . . . o1, o2, o3, and o4 of the first ODU service processing unit respectively. At locations of timeslots 1, 5, and 9, higher-order ODU sub-service 2 corresponds to output ports o2, o3, and o4 of the first ODU service processing unit respectively. The first ODU service processing unit sends Ethernet frames to an Ethernet switching unit according to the timeslot mapping table shown in FIG. 7(a) and at locations of the output ports corresponding to the timeslots.

When a rate of the ODUflex carried in higher-order ODU sub-service 2 increases, for example, increases from 1.2 Gbps to 2.4 Gbps, an ODUflex demapping unit obtains resize control overhead information RCOH information in the higher-order ODU frame and resize control overhead information RCOH information of an ODUflex frame in the ODU service. The timeslot allocation unit adjusts, according to the two types of RCOH information, the number of the timeslots occupied by the ODUflex frame, and generates an adjusted table of the mapping between the output ports of the first ODU service processing unit and timeslots. In the embodiment of the present invention, the resize control overhead information in the ODU frame is link connection resize information (Link Connection Resize, LCR), and resize control overhead information of the ODUflex frame is bandwidth resize information (Bandwidth Resize, BWR). In the embodiment of the present invention, if the rate of the ODUflex doubles, the timeslot allocation unit generates, through adjustment according to the synchronization frame period, the LCR information of the higher-order ODU frame, and the BWR information of the ODUflex frame and based on an interleaved allocation method, an adjusted timeslot mapping table of FIG. 7(b), corresponding to the output ports of the first ODU service processing unit. The first ODU service processing unit sends the Ethernet frames to the Ethernet switching unit according to the adjusted timeslot mapping table.

As shown in FIG. 7(b), on the basis of FIG. 7(a), at the locations of the timeslots 3, 7, and 11 corresponding to higher-order ODU sub-service 2, three output ports o1, o1, and o2 of the first ODU service processing unit are added, that is, in one synchronization frame period, the number of output ports doubles, so that the ODUflex frame with an increased rate can be encapsulated into an Ethernet frame and the Ethernet frame is sent. The output ports of the first ODU service processing unit in the timeslots corresponding to higher-order ODU sub-service 1 remain unchanged. A process of adjusting timeslots and encapsulation is specifically as follows:

The timeslot allocation unit increases, according to information that bandwidth needs to be increased, the number of the timeslots occupied by the ODUflex frame, and generates the adjusted table of the mapping between the output ports of the first ODU service processing unit and timeslots, where the information is indicated by the link connection resize information LCR information in the overhead information of the received higher-order ODU frame. In the embodiment of the present invention, the increased number of timeslots is 3.

The slice length is updated, and the updated slice length is sent to the first ODU service processing unit, to perform Ethernet frame encapsulation according to the updated slice length. In the embodiment of the present invention, the slice length of the ODUflex frame encapsulated in the Ethernet frame before the updating is 204 bytes or 205 bytes, and the slice length of the ODUflex frame encapsulated in the Ethernet frame after the updating is 102 bytes or 103 bytes.

The updated slice length is updated according to the information that bandwidth needs to be increased, and the updated slice length is sent to the first ODU service processing unit, to perform Ethernet frame encapsulation according to the updated slice length, where the information is indicated by bandwidth resize information BWR information in the overhead information of the received ODUflex frame. In the embodiment of the present invention, the "the updated slice length is updated" is specifically changing "the slice length of the ODUflex frame encapsulated in the Ethernet frame is 102 bytes or 103 bytes" to "the slice length of the ODUflex frame encapsulated in the Ethernet frame is 204 bytes or 205 bytes".

FIG. 7(c) and FIG. 7(d) respectively show a table of a mapping between the input ports of the Ethernet switching unit and timeslots in a frame period and a table of a mapping between the output ports of the Ethernet switching unit and timeslots in a frame period, where the tables are generated by the switching output port allocation unit according to the foregoing adjusted timeslot mapping table. The Ethernet switching unit has four service input ports si1, si2, si3, and si4 and four service output ports so1, so2, so3, and so4. In the embodiment of the present invention, at locations of timeslots 1 to 12 in the table of the mapping between the input ports of the Ethernet switching unit and timeslots in a frame period, higher-order ODU sub-service 1 corresponds to input ports si1, si2, si3, si4 . . . si1, si2, si3, and si4 of the Ethernet switching unit, and at locations of timeslots 1, 3, 5, 7, 9, and 11, higher-order ODU sub-service 2 corresponds to input ports si2, si1, si3, si1, si4, and si2 of the Ethernet switching unit, that is, in corresponding timeslots and on corresponding input ports of the Ethernet switching unit, the Ethernet switching unit receives and forwards the Ethernet frames to the second ODU service processing unit. Accordingly, at locations of timeslots 1 to 12 in the table of the mapping between the output ports of the Ethernet switching unit and timeslots in a frame period, higher-order ODU sub-service 1 corresponds to output ports so2, so3, so4, so1 . . . so2, so3, so4, and so1 of the Ethernet switching unit; and at locations of timeslots 1, 3, 5, 7, 9, and 11, higher-order ODU sub-service 2 corresponds to output ports so3, so2, so4, so2, so1, and so3 of the Ethernet switching unit.

In specific implementation, the switching output port allocation unit generates the table of the mapping between the input ports of the Ethernet switching unit and timeslots in a frame period and the table of the mapping between the output ports of the Ethernet switching unit and timeslots in a frame period according to the timeslot mapping table generated by the timeslot allocation unit, and determines an allocation forwarding command of the Ethernet switching unit according to the table of the mapping between the input ports of the Ethernet switching unit and timeslots in a frame period and the table of the mapping between the output ports of the Ethernet switching unit and timeslots in a frame period. The Ethernet switching unit sends the Ethernet frame to the second ODU service processing unit according to the received allocation forwarding command of the Ethernet switching unit. The second ODU service processing unit is configured to perform decapsulation processing on the received Ethernet frame according to the table of the mapping between the output ports of the Ethernet switching unit and timeslots in a frame period, where the table is determined by the switching output port allocation unit, to obtain Ethernet payload bit stream data; encapsulate the Ethernet payload bit stream data into the higher-order ODU frame; and send the higher-order ODU frame.

In the embodiment of the present invention, by using a first ODU service processing unit, a timeslot allocation unit, a switching output port allocation unit, an Ethernet switching unit, and a second ODU service processing unit, a higher-order ODU service is forwarded according to a table of a mapping between output ports of the first ODU service processing unit and timeslots and an allocation forwarding command of the Ethernet switching unit, which resolves a problem in the prior art that an ODUflex frame cannot be transported by using the Ethernet switching unit, thereby ensuring that service congestion does not occur on a forwarding port of a transport apparatus, and improving transmission quality of a communications network.

FIG. 8(a)-8(d) shows a timeslot mapping table and a frame period timeslot table that correspond to a fifth embodiment of the present invention. For a schematic diagram of an apparatus for transporting an ODU service according to the fifth embodiment of the present invention, refer to the schematic diagram of the apparatus for transporting an ODU service shown in FIG. 3. In the fifth embodiment of the present invention, the number of timeslots in a synchronization frame period is 24, and a service type is a first category of higher-order ODU service. The higher-order ODU service includes ODU1, ODU2, ODU3, and ODU4, whose rates are 2.5 Gbit/s, 10 Gbit/s, 40 Gbit/s, and 100 Gbit/s respectively. In the embodiment of the present invention, output ports of a first ODU service processing unit are of and o2. A major difference between this embodiment and the third embodiment is that, a device in the present invention receives one higher-order ODU service but not at least two higher-order ODU services, and the first ODU service processing unit has two but not four output ports, and therefore the embodiment of the present invention is basically the same as the third embodiment in processing implementation except that the two factors are involved; for what is not clearly described in this embodiment, refer to the third embodiment. FIG. 8(a) shows a table of a mapping between the output ports of the first ODU service processing unit and timeslots. In the embodiment of the present invention, a payload length of each Ethernet frame is 256 bytes, and a transmission rate of a port distribution unit is 12 Gbps. The timeslot allocation unit determines, according to the number 24 of the timeslots in the synchronization frame period and a rate 9.6 Gbps of ODUflex carried in this higher-order ODU service, that the ODUflex in the higher-order ODU service requires 24 Ethernet frames for encapsulation, that is, the ODUflex in the higher-order ODU service occupies the timeslots in the entire synchronization frame period. As shown in FIG. 8(a), locations of timeslots 1 to 24 correspond to output ports o1, o2 . . . o1, and o2 of the first ODU service processing unit respectively. The first ODU service processing unit sends the Ethernet frames to an Ethernet switching unit according to the timeslot mapping table shown in FIG. 8(a) and at locations of the output ports corresponding to the timeslots.

When the rate of the ODUflex carried in the higher-order ODU service decreases, for example, decreases from 9.6 Gbps to 1.2 Gbps, an ODUflex demapping unit obtains resize control overhead information RCOH information in the higher-order ODU frame and resize control overhead information RCOH information of an ODUflex frame in the ODU service. The timeslot allocation unit adjusts, according to the two types of RCOH information, the number of the timeslots occupied by the ODUflex frame, and generates an adjusted table of the mapping between the output ports of the first ODU service processing unit and timeslots. In the embodiment of the present invention, the resize control overhead information in the ODU frame is link connection resize information (Link Connection Resize, LCR), and resize control overhead information of the ODUflex frame is bandwidth resize information (Bandwidth Resize, BWR). In the embodiment of the present invention, if the rate of the ODUflex carried in a higher-order ODU sub-service decreases to ⅛ of the original rate, the timeslot allocation unit generates, through adjustment according to the synchronization frame period, the LCR information of the higher-order ODU frame, and the BWR information of the ODUflex frame and based on an interleaved allocation method, an adjusted timeslot mapping table FIG. 8(b), corresponding to the output ports of the first ODU service processing unit. The first ODU service processing unit sends the Ethernet frames to the Ethernet switching unit according to the adjusted timeslot mapping table.

As shown in FIG. 8(b), at locations of timeslots 8, 16, and 24, three output ports o2, o2, and o2 of the first ODU service processing unit are retained and ports at locations of other timeslots are deleted, that is, in one synchronization frame period, the number of output ports changes from the original 24 to 3, so that the ODUflex frame with a decreased rate can be encapsulated into an Ethernet frame and the Ethernet frame is sent. A process of adjusting timeslots and encapsulation is specifically as follows:

The timeslot allocation unit is specifically configured to update a slice length according to information that bandwidth needs to be decreased, and send the updated slice length to the first ODU service processing unit, to perform Ethernet frame encapsulation according to the updated slice length, where the information is indicated by the bandwidth resize information BWR information in the overhead information of the received ODUflex frame. In the embodiment of the present invention, the slice length of the ODUflex frame encapsulated in the Ethernet frame before the updating is 204 bytes or 205 bytes, and the slice length of the ODUflex frame encapsulated in the Ethernet frame after the updating is 25 bytes or 26 bytes.

The number of the timeslots occupied by the ODUflex frame is decreased according to the information that bandwidth needs to be decreased, an adjusted table of the mapping between the output ports of the first ODU service processing unit and timeslots is generated, and the updated slice length is updated and sent to the first ODU service processing unit, so that Ethernet frame encapsulation is performed according to the updated slice length, where the information is indicated by the link connection resize information LCR information in the overhead information of the received higher-order ODU frame. In the embodiment of the present invention, the decreased number of timeslots is 21. In the embodiment of the present invention, the "the updated slice length is updated" is specifically changing "the slice length of the ODUflex frame encapsulated in the Ethernet frame is 25 bytes or 26 bytes" to "the slice length of the ODUflex frame encapsulated in the Ethernet frame is 204 bytes or 205 bytes".

FIG. 8(c) and FIG. 8(d) respectively show a table of a mapping between the input ports of the Ethernet switching unit and timeslots in a frame period and a table of a mapping between the output ports of the Ethernet switching unit and timeslots in a frame period, where the tables are generated by the switching output port allocation unit according to the foregoing adjusted timeslot mapping table. The Ethernet switching unit has two service input ports si1/si2 and two service output ports so1/so2. In the embodiment of the present invention, locations of timeslots 8, 16, and 24 in the table of the mapping between the input ports of the Ethernet switching unit and timeslots in a frame period correspond to input ports si2, si2, and si2, that is, in corresponding timeslots and on corresponding input ports of the Ethernet switching unit, the Ethernet switching unit receives and forwards the Ethernet frames to the second ODU service processing unit. Accordingly, locations of timeslots 8, 16, and 24 in the table of the mapping between the output ports of the Ethernet switching unit and timeslots in a frame period correspond to output ports so1, so1, and so1 of the Ethernet switching unit.

In specific implementation, the switching output port allocation unit generates the table of the mapping between the input ports of the Ethernet switching unit and timeslots in a frame period and the table of the mapping between the output ports of the Ethernet switching unit and timeslots in a frame period according to the timeslot mapping table generated by the timeslot allocation unit, and determines an allocation forwarding command of the Ethernet switching unit according to the table of the mapping between the input ports of the Ethernet switching unit and timeslots in a frame period and the table of the mapping between the output ports of the Ethernet switching unit and timeslots in a frame period. The Ethernet switching unit sends the Ethernet frame to the second ODU service processing unit according to the received allocation forwarding command of the Ethernet switching unit. The second ODU service processing unit is configured to perform decapsulation processing on the received Ethernet frame according to the table of the mapping between the output ports of the Ethernet switching unit and timeslots in a frame period, where the table is determined by the switching output port allocation unit, to obtain Ethernet payload bit stream data; encapsulate the Ethernet payload bit stream data into the higher-order ODU frame; and send the higher-order ODU frame.

In the embodiment of the present invention, by using a first ODU service processing unit, a timeslot allocation unit, a switching output port allocation unit, an Ethernet switching unit, and a second ODU service processing unit, a higher-order ODU service is forwarded according to a table of a mapping between output ports of the first ODU service processing unit and timeslots and an allocation forwarding command of the Ethernet switching unit, which resolves a problem in the prior art that an ODUflex frame cannot be transported by using the Ethernet switching unit, thereby ensuring that service congestion does not occur on a forwarding port of a transport apparatus, and improving transmission quality of a communications network.

It should be noted that, higher-order ODUs in this application refer to ODU1, ODU2, ODU3, and ODU4 that carry ODUflex frames. ODUflex needs to be carried in an ODU frame whose rate is higher than that of the ODUflex, that is, a rate of an ODU used as a carrier should not be lower than a rate of ODUflex that the ODU carries, and therefore, the ODU is called a higher-order ODU. For example, ODUflex whose rate is about 1.25 Gbps is carried by using ODU2, then the ODU2 is a high-order ODU of the ODUflex.

Figure 9:
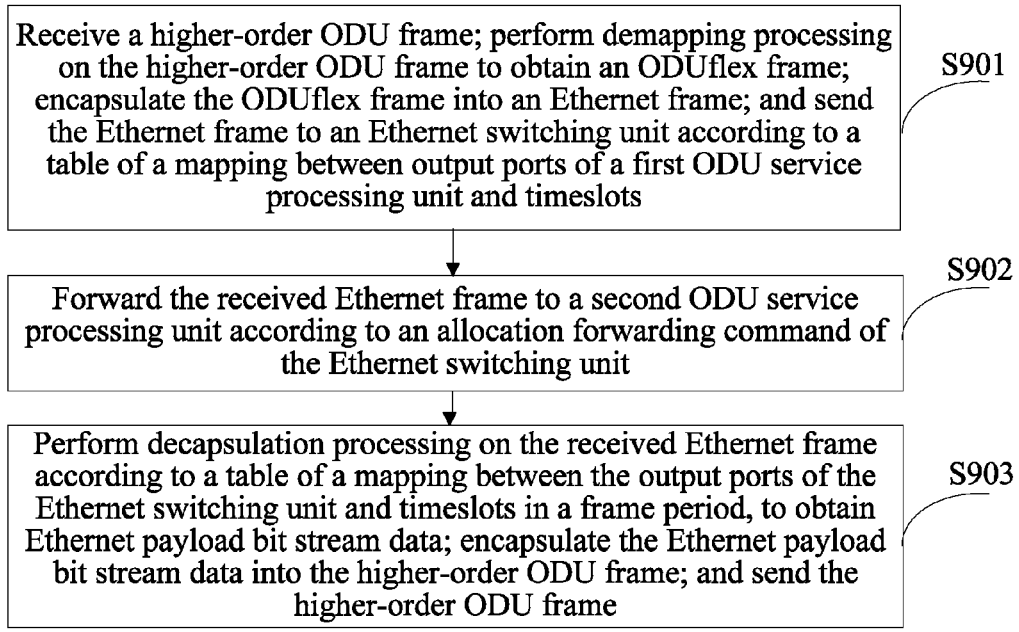
FIG. 9 is a schematic diagram of a method for transporting an ODU service according to another embodiment of the present invention.

FIG. 9 is a schematic diagram of a method for transporting an ODU service according to another embodiment of the present invention.

Step S901: Receive a higher-order ODU frame; perform demapping processing on the higher-order ODU frame to obtain an ODUflex frame; encapsulate the ODUflex frame into an Ethernet frame; and send the Ethernet frame to an Ethernet switching unit according to a table of a mapping between output ports of a first ODU service processing unit and timeslots.

Step S902: Forward the Ethernet frame received by the Ethernet switching unit to a second ODU service processing unit according to an allocation forwarding command of the Ethernet switching unit. The allocation forwarding command of the Ethernet switching unit is determined according to a table of a mapping between input ports of the Ethernet switching unit and timeslots in a frame period and a table of a mapping between output ports of the Ethernet switching unit and timeslots in a frame period; the table of the mapping between the output ports of the Ethernet switching unit and timeslots in a frame period is determined according to the table of the mapping between the input ports of the Ethernet switching unit and timeslots in a frame period, and the table of the mapping between the input ports of the Ethernet switching unit and timeslots in a frame period is determined according to the table of the mapping between the output ports of the first ODU service processing unit and timeslots.

Step S903: Perform decapsulation processing on the received Ethernet frame according to the table of the mapping between the output ports of the Ethernet switching unit and timeslots in a frame period to obtain Ethernet payload bit stream data; encapsulate the Ethernet payload bit stream data into the higher-order ODU frame; and send the higher-order ODU frame.

Further, step S901 may be specifically:

receiving the higher-order ODU frame; extracting overhead information of the higher-order ODU frame; and performing demapping processing on the higher-order ODU frame to obtain the ODUflex frame;

determining a rate of the ODUflex frame according to the extracted overhead information, and encapsulating the ODUflex frame into an Ethernet frame according to the rate of the ODUflex frame and a slice length of the ODUflex frame; and sending the Ethernet frame to the Ethernet switching unit according to the table of the mapping between the output ports of the first ODU service processing unit and timeslots.

Further, for determining of the timeslot mapping table, specifically refer to implementation of the method in foregoing embodiments. The determining may simply be: generating one synchronization frame period, determining, according to the rate of the obtained ODUflex frame, an output port rate of the first ODU service processing unit, and the synchronization frame period, the number of timeslots in the synchronization frame period that are occupied by the ODUflex frame and the slice length of the ODUflex frame, and determining, according to an interleaved allocation method, the table of the mapping between the output ports of the first ODU service processing unit and timeslots that includes a mapping between the output ports of the first ODU service processing unit and the timeslots in the synchronization frame period.

Further, the determining of the timeslot mapping table may further be specifically: generating one synchronization frame period, determining, according to the rate of the obtained ODUflex frame and the synchronization frame period and in accordance with a pre-configured mapping between the rate of the ODUflex frame and the number of timeslots in the synchronization frame period that are occupied by the ODUflex frame, the number of the timeslots in the synchronization frame period that are occupied by the ODUflex frame and the slice length of the ODUflex frame, and determining, according to the interleaved allocation method, the table of the mapping between the output ports of the first ODU service processing unit and timeslots that includes a mapping between the output ports of the first ODU service processing unit and the timeslots in the synchronization frame period. The pre-configured mapping between the rate of the ODUflex frame and the number of the timeslots in the synchronization frame period that are occupied by the ODUflex frame is specifically the mapping between the rate of the ODUflex frame and the number of the timeslots in the synchronization frame period that are occupied by the ODUflex frame with this rate. For example, in the synchronization frame period in which the number of timeslots is 24, when the rate of the ODUflex frame is 2.4 Gbps, the number of timeslots in the synchronization frame period that are occupied by the ODUflex frame with this rate is 6, and the slice length of the ODUflex frame encapsulated in the Ethernet frame is 204 bytes or 205 bytes; and when the rate of the ODUflex frame is 9.6 Gbps, the number of timeslots in the synchronization frame period that are occupied by the ODUflex frame with this rate is 24, and the slice length of the ODUflex frame encapsulated in the Ethernet frame is 204 bytes or 205 bytes. As can be seen, the number of times by which the number of the timeslots in the synchronization frame period that are occupied by the ODUflex frame increases is exactly equal to the number of times by which the rate of the ODUflex frame corresponding to the number of timeslots increases, that is, four times. The pre-configured mapping between the number of times for the rate of the ODUflex frame and the number of the timeslots in the synchronization frame period that are occupied by the ODUflex frame may include rates of ODUflex frames of more types, for example, when the rate of the ODUflex frame is 1.2 Gbps, the number of timeslots in the synchronization frame period that are occupied by the ODUflex frame with this rate is 3. Under the premise of synchronization frame periods of multiple types, an output port rate of the first ODU service processing unit, and the different numbers of Ethernet frame payloads, the mapping between the number of times for the rate of the ODUflex frame and the number of the timeslots in the synchronization frame period that are occupied by the ODUflex frame in the embodiment of the present invention may be set to a mapping between ODUflex frames with different rates and the numbers of timeslots in the synchronization frame period that are occupied by the ODUflex frames. The slice length of the ODUflex frame encapsulated in the Ethernet frame may be directly preset to 204 bytes or 205 bytes, and this entry does not need to be set in a mapping table. Certainly, in the embodiment of the present invention, a person in the art knows that, the first ODU service processing unit, or modules or functional units (for example, an Ethernet encapsulation unit and an ODUflex decapsulation unit) in the first ODU service processing unit may also determine through calculation or be preset with the slice length of the ODUflex frame; and the specific process is similar to that of the foregoing embodiment, and is not described herein again.

Further, the embodiment of the present invention may further include: extracting resize control overhead information RCOH information in the overhead information of the higher-order ODU frame, and adjusting, according to the two types of RCOH information, the number of the timeslots occupied by the ODUflex frame, and generating an adjusted table of the mapping between the output ports of the first ODU service processing unit and timeslots. The first ODU service processing unit sends the Ethernet frame to the Ethernet switching unit according to the adjusted timeslot mapping table. Further, an encapsulation length may be adjusted according to the resize control overhead information RCOH information, generally BWR, in the overhead information of the ODUflex frame, to implement fine adjustment. For specific implementation, also refer to the foregoing embodiment.

Specifically, increasing, according to information that bandwidth needs to be increased, the number of the timeslots occupied by the ODUflex frame, and generating an adjusted table of the mapping between the output ports of the first ODU service processing unit and timeslots, where the information is indicated by the link connection resize information LCR information in the overhead information of the received higher-order ODU frame;

updating the slice length, and sending the updated slice length to the first ODU service processing unit, to perform Ethernet frame encapsulation according to the updated slice length; and updating the updated slice length according to the information that bandwidth needs to be increased, and sending the updated slice length to the first ODU service processing unit, to perform Ethernet frame encapsulation according to the updated slice length, where the information is indicated by bandwidth resize information BWR information in the overhead information of the received ODUflex frame.

The embodiment of the present invention may further be specifically:

updating the slice length according to information that bandwidth needs to be decreased, and sending the updated slice length to the first ODU service processing unit, to perform Ethernet frame encapsulation according to the updated slice length, where the information is indicated by the bandwidth resize information BWR information in the overhead information of the received ODUflex frame; and decreasing, according to the information that bandwidth needs to be decreased, the number of the timeslots occupied by the ODUflex frame, generating an adjusted table of the mapping between the output ports of the first ODU service processing unit and timeslots, updating the updated slice length, and sending the updated slice length to the first ODU service processing unit, to perform Ethernet frame encapsulation according to the updated slice length, where the information is indicated by the link connection resize information LCR information in the overhead information of the received higher-order ODU frame.

Further, the embodiment of the present invention may further include: generating a clock signal, where the clock signal is used to synchronize a reference time of the synchronization frame period, so that all frame periods of the synchronization frame period are synchronous in time.

For more detailed description of each step in the method for transporting an ODU service in the embodiment of the present invention, refer to the foregoing Embodiment 1 to Embodiment 5, which are not described herein again.

It should be noted that, all embodiments of the present invention are detailed description based on a general invention conception, and relevant description can be mutually quoted between these embodiments.

In the present invention, a higher-order ODU service is forwarded by using a timeslot mapping table and an allocation forwarding command of an Ethernet switching unit, which resolves a problem in the prior art that an ODUflex frame cannot be transported by using the Ethernet switching unit, thereby ensuring that service congestion does not occur on a forwarding port of a transport apparatus, and improving transmission quality of a communications network.

A person of ordinary skill in the art may be aware that, units and algorithm steps in examples that are described with reference to embodiments disclosed in this document can be implemented by electronic hardware or a combination of computer software and electronic hardware. Whether these functions are performed by hardware or software depends on particular applications and design constraint conditions of the technical solutions. A person skilled in the art may use different methods to implement the described functions for each particular application, but it shall not be considered that the implementation goes beyond a scope of the present invention.

In the several embodiments provided in the present application, it should be understood that the disclosed system, apparatus, and method may be implemented in another manner. For example, the apparatus embodiments described above are merely schematic. For example, the unit division is merely logical function division and may be in another division manner in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may be or may not be physically separate, and parts displayed as units may be or may not be physical units, may be located at one position, or may be distributed onto a plurality of network units. A part or all of the units may be selected according to actual needs to achieve the objectives of the solutions of the embodiments.

In addition, functional units in the embodiments of the present invention may be integrated into one processing unit, or each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions of the present invention essentially, or the part contributing to the prior art, or a part of the technical solutions may be implemented in a form of a software product. The software product is stored in a storage medium, and includes several instructions for instructing a computer device (which may be a personal computer, a server, or a network device or the like) to perform all or a part of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

Figure 10:
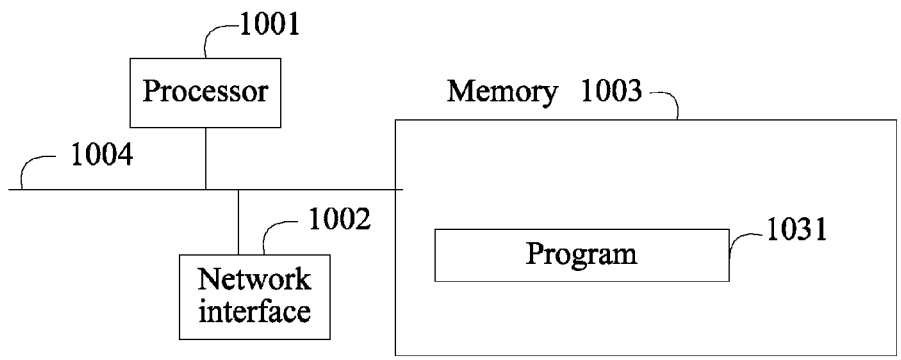
FIG. 10 is a schematic structural diagram of a first ODU service processing unit according to another embodiment of the present invention.

In another embodiment of the present invention, the first ODU service processing unit in the foregoing embodiment may be shown in FIG. 10, and includes at least one processor 1001 (for example, a CPU), at least one network interface 1002 or another communications interface, a memory 1003, and at least one communications bus 1004 that is used for implementing connection and communication between these apparatuses. The processor 1001 is configured to execute an executable module stored in the memory 1003, for example, a computer program. The memory 1003 may include a high-speed random access memory (RAM: Random Access Memory), and may further include a non-volatile memory (non-volatile memory), for example, at least one magnetic disk memory. A communication connection between a gateway of the system and at least one other network element is implemented through the at least one network interface 1002 (may be wired or wireless), and the Internet, a wide area network, a local network, a metropolitan area network, and the like can be used.

In some implementation manners, the memory 1003 stores a program 1031, and the program 1031 can be executed by the processor 1001, where the program includes:

receiving a higher-order ODU frame; performing demapping processing on the higher-order ODU frame to obtain an ODUflex frame; encapsulating the ODUflex frame into an Ethernet frame; and sending the Ethernet frame to an Ethernet switching unit according to a table of a mapping between output ports of a first ODU service processing unit and timeslots, where the table is determined by a timeslot allocation unit.

In another embodiment of the present invention, for a structure of a second ODU service processing unit, refer to FIG. 10, and the second ODU service processing unit may also include at least one processor 1101 (for example, a CPU), at least one network interface 1102 or another communications interface, a memory 1103, and at least one communications bus 1104 that is used for implementing connection and communication between these apparatuses. The processor 1101 is configured to execute an executable module stored in the memory 1103, for example, a computer program. The memory 1103 may include a high-speed random access memory (RAM: Random Access Memory), and may further include a non-volatile memory (non-volatile memory), for example, at least one magnetic disk memory. A communication connection between a gateway of the system and at least one other network element is implemented through the at least one network interface 1102 (may be wired or wireless), and the Internet, a wide area network, a local network, a metropolitan area network, and the like can be used.

In some implementation manners, the memory 1103 stores a program 1131, and the program 1131 can be executed by the processor 1101, where the program includes:

performing decapsulation processing on a received Ethernet frame according to a table of a mapping between output ports of an Ethernet switching unit and timeslots in a frame period, where the table is determined by a switching output port allocation unit, to obtain Ethernet payload bit stream data; encapsulating the Ethernet payload bit stream data into the higher-order ODU frame; and sending the higher-order ODU frame.

The foregoing descriptions are merely specific implementation manners of the present invention, but are not intended to limit a protection scope of the present invention. Any variation or replacement readily figured out by a person skilled in the art within a technical scope disclosed in the present invention shall fall within the protection scope of the present invention. Therefore, the protection scope of the present invention shall be subject to the protection scope of the claims.

What is claimed is:

1. An apparatus for transporting an optical channel data unit (ODU) service, comprising:
  a first ODU service processing unit,
  a timeslot allocation unit,
  a switching output port allocation unit,
  an Ethernet switching unit, and
  a second ODU service processing unit, wherein:
the first ODU service processing unit is configured to: receive a higher-order ODU frame; perform demapping processing on the higher-order ODU frame to obtain an ODUflex frame; encapsulate the ODUflex frame into an Ethernet frame; and send the Ethernet frame to the Ethernet switching unit according to a table of a mapping between output ports of the first ODU service processing unit and timeslots;
the timeslot allocation unit is configured to determine the table of the mapping between the output ports of the first ODU service processing unit and timeslots;
the switching output port allocation unit is configured to: determine a table of a mapping between input ports of the Ethernet switching unit and timeslots in a frame period, determine a table of a mapping between output ports of the Ethernet switching unit and timeslots in a frame period according to the table of the mapping between the output ports of the first ODU service processing unit and timeslots, and determine an allocation forwarding command of the Ethernet switching unit according to the table of the mapping between the input ports of the Ethernet switching unit and timeslots in a frame period and the table of the mapping between the output ports of the Ethernet switching unit and timeslots in a frame period;
the Ethernet switching unit is configured to forward the received Ethernet frame to the second ODU service processing unit according to the allocation forwarding command of the Ethernet switching unit; and
the second ODU service processing unit is configured to: perform decapsulation processing on the received Ethernet frame according to the table of the mapping between the output ports of the Ethernet switching unit and timeslots in a frame period to obtain Ethernet payload bit stream data; encapsulate the Ethernet payload bit stream data into the higher-order ODU frame; and send the higher-order ODU frame.

2. The apparatus according to claim 1, wherein the timeslot allocation unit is configured to
generate one synchronization frame period,
determine, according to a rate of the obtained ODUflex frame, an output port rate of the first ODU service processing unit, the synchronization frame period, and a preset Ethernet frame payload length, the number of timeslots in the synchronization frame period that are occupied by the ODUflex frame, and
determine, according to an interleaved allocation method, the table of the mapping between the output ports of the first ODU service processing unit and timeslots that comprises a mapping between the output ports of the first ODU service processing unit and the timeslots in the synchronization frame period.

3. The apparatus according to claim 1, wherein the timeslot allocation unit is configured to
generate one synchronization frame period,
determine, according to a rate of the obtained ODUflex frame and a mapping between the rate of the ODUflex frame and the number of timeslots in the synchronization frame period that are occupied by the ODUflex frame, the number of the timeslots in the synchronization frame period that are occupied by the ODUflex frame, and
determine, according to an interleaved allocation method, the table of the mapping between the output ports of the first ODU service processing unit and timeslots that comprises a mapping between the output ports of the first ODU service processing unit and the timeslots in the synchronization frame period.

4. The apparatus according to claim 3, wherein
the ODUflex demapping unit is further configured to extract link connection resize information LCR information in overhead information of the higher-order ODU frame; and
the timeslot allocation unit
increases, according to information that bandwidth needs to be increased, the number of the timeslots occupied by the ODUflex frame, and generates an adjusted table of the mapping between the output ports of the first ODU service processing unit and timeslots, wherein the information is indicated by the LCR information; or
decreases, according to information that bandwidth needs to be decreased, the number of the timeslots occupied by the ODUflex frame, and generates an adjusted table of the mapping between the output ports of the first ODU service processing unit and timeslots, wherein the information is indicated by the LCR information.

5. The apparatus according to claim 4, wherein the timeslot allocation unit is configured to
increase, according to the information that bandwidth needs to be increased, the number of the timeslots occupied by the ODUflex frame, and generate the adjusted table of the mapping between the output ports of the first ODU service processing unit and timeslots, wherein the information is indicated by the link connection resize information LCR information in the overhead information of the received higher-order ODU frame;
update a slice length to obtain an updated slice length; and
update the updated slice length according to the information that bandwidth needs to be increased, wherein the information is indicated by bandwidth resize (BWR) information in the overhead information of the received ODUflex frame.

6. The apparatus according to claim 4, wherein the timeslot allocation unit is configured to:
update, according to the information that bandwidth needs to be decreased, a slice length to obtain an updated slice length, wherein the information is indicated by bandwidth resize information BWR information in the overhead information of the received ODUflex frame; and
decrease, according to the information that bandwidth needs to be decreased, the number of the timeslots occupied by the ODUflex frame, generate the adjusted table of the output ports of the first ODU service processing unit and timeslots, and update the updated slice length, wherein the information is indicated by the link connection resize (LCR) information in the overhead information of the received higher-order ODU frame.

7. The apparatus according to claim 1, wherein the first ODU service processing unit comprises:
an ODUflex demapping unit,
an Ethernet encapsulation unit, and
a port distribution unit,
wherein:
the ODUflex demapping unit is configured to: receive the higher-order ODU frame; extract overhead information of the higher-order ODU frame; and perform demapping processing on the higher-order ODU frame to obtain the ODUflex frame;

the Ethernet encapsulation unit is configured to: determine the rate of the ODUflex frame according to the extracted overhead information, determine a slice length of the ODUflex frame according to the rate of the ODUflex frame, and encapsulate the ODUflex frame into an Ethernet frame according to the determined slice length of the ODUflex frame; and the port distribution unit is configured to send the Ethernet frame to the Ethernet switching unit according to the timeslot mapping table determined by the timeslot allocation unit.

8. The apparatus according to claim 1, further comprising a synchronization clock unit, configured to provide a clock signal for the timeslot allocation unit, wherein the clock signal is used to synchronize a reference time of the synchronization frame period, so that all frame periods generated by the timeslot allocation unit are synchronous in time.

9. A method for transporting an optical channel data unit (ODU) service, comprising:
receiving a higher-order ODU frame;
performing demapping processing on the higher-order ODU frame to obtain an ODUflex frame;
encapsulating the ODUflex frame into an Ethernet frame;
sending the Ethernet frame to an Ethernet switching unit according to a table of a mapping between output ports of a first ODU service processing unit and timeslots;
forwarding the received Ethernet frame to a second ODU service processing unit according to an allocation forwarding command of the Ethernet switching unit, wherein the allocation forwarding command of the Ethernet switching unit is determined according to a table of a mapping between input ports of the Ethernet switching unit and timeslots in a frame period and a table of a mapping between output ports of the Ethernet switching unit and timeslots in a frame period, and the table of the mapping between the output ports of the Ethernet switching unit and timeslots in a frame period and the table of the mapping between the output ports of the Ethernet switching unit and timeslots in a frame period are determined according to the table of the mapping between the input ports of the Ethernet switching unit and timeslots in a frame period;
performing decapsulation processing on the received Ethernet frame according to the table of the mapping between the output ports of the Ethernet switching unit and timeslots in a frame period to obtain Ethernet payload bit stream data;
encapsulating the Ethernet payload bit stream data into the higher-order ODU frame; and
sending the higher-order ODU frame.

10. The method according to claim 9, further comprising:
extracting overhead information of the higher-order ODU frame;
performing demapping processing on the higher-order ODU frame to obtain the ODUflex frame;
determining a rate of the ODUflex frame according to the extracted overhead information, determining a slice length of the ODUflex frame according to the rate of the ODUflex frame, and encapsulating the ODUflex frame into an Ethernet frame according to the determined slice length of the ODUflex frame; and
sending the Ethernet frame to the Ethernet switching unit according to the table of the mapping between the output ports of the first ODU service processing unit and timeslots.

11. The method according to claim 9, further comprising:
generating one synchronization frame period, and determining, according to a rate of the obtained ODUflex frame, an output port rate of the first ODU service processing unit, the synchronization frame period, and a preset Ethernet frame payload length, the number of timeslots in the synchronization frame period that are occupied by the ODUflex frame, and
determining, according to an interleaved allocation method, the table of the mapping between the output ports of the first ODU service processing unit and timeslots that comprises a mapping between the output ports of the first ODU service processing unit and the timeslots in the synchronization frame period.

12. The method according to claim 9, further comprising:
generating one synchronization frame period,
determining, according to a rate of the obtained ODUflex frame and a mapping between the rate of the ODUflex frame and the number of timeslots in the synchronization frame period that are occupied by the ODUflex frame, the number of timeslots in the synchronization frame period that are occupied by the ODUflex frame, and
determining, according to an interleaved allocation method, the table of the mapping between the output ports of the first ODU service processing unit and timeslots that comprises a mapping between the output ports of the first ODU service processing unit and the timeslots in the synchronization frame period.

13. The method according to claim 9, further comprising:
extracting link connection resize information LCR information in the overhead information of the higher-order ODU frame.

14. The method according to claim 13, further comprising:
increasing, according to information that bandwidth needs to be increased, the number of the timeslots occupied by the ODUflex frame, and generating the adjusted table of the mapping between the output ports of the first ODU service processing unit and timeslots, wherein the information is indicated by the link connection resize (LCR) information in the overhead information of the received higher-order ODU frame;
updating the slice length to obtain an updated slice length; and
updating the updated slice length according to the information that bandwidth needs to be increased, and sending the updated slice length to the first ODU service processing unit, to perform Ethernet frame encapsulation according to the updated slice length, wherein the information is indicated by bandwidth resize (BWR) information in the overhead information of the received ODUflex frame.

15. The method according to claim 13, further comprising:
updating, according to information that bandwidth needs to be decreased, the slice length to obtain an updated slice length, wherein the information is indicated by bandwidth resize information BWR information in the overhead information of the received ODUflex frame; and
decreasing, according to the information that bandwidth needs to be decreased, the number of the timeslots occupied by the ODUflex frame, and generating the adjusted table of the mapping between the output ports of the first ODU service processing unit and timeslots, wherein the information is indicated by the link connection resize information LCR information in the overhead information of the received higher-order ODU frame.

16. The method according to claim 13, further comprising:
increasing, according to information that bandwidth needs to be increased, the number of the timeslots occupied by the ODUflex frame, and generating an adjusted table of the mapping between the output ports of the first ODU service processing unit and timeslots, wherein the information is indicated by the LCR information; or decreasing, according to information that bandwidth needs to be decreased, the number of the timeslots occupied by the ODUflex frame, and generating an adjusted table of the mapping between the output ports of the first ODU service processing unit and timeslots, wherein the information is indicated by the LCR information.

17. The method according to claim 9, further comprising:
generating a clock signal, wherein the clock signal is used to synchronize a reference time of the synchronization frame period, so that all frame periods of the synchronization frame period are synchronous in time.

* * * * *